United States Patent
Shintani et al.

(10) Patent No.: US 9,491,436 B2
(45) Date of Patent: Nov. 8, 2016

(54) IMAGING APPARATUS AND METHOD FOR CONTROLLING SAME

(75) Inventors: Takuya Shintani, Inagi (JP); Yuuzou Aoyama, Kawasaki (JP); Takayuki Nakahama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 333 days.

(21) Appl. No.: 13/615,996

(22) Filed: Sep. 14, 2012

(65) Prior Publication Data

US 2013/0083166 A1   Apr. 4, 2013

(30) Foreign Application Priority Data

Oct. 4, 2011   (JP) .................................. 2011-220409
Dec. 2, 2011   (JP) .................................. 2011-264204
Dec. 2, 2011   (JP) .................................. 2011-264282

(51) Int. Cl.
   *H04N 13/00* (2006.01)
   *H04N 13/02* (2006.01)

(52) U.S. Cl.
   CPC ...... *H04N 13/0055* (2013.01); *H04N 13/0029* (2013.01); *H04N 13/0059* (2013.01); *H04N 13/0062* (2013.01); *H04N 13/0239* (2013.01)

(58) Field of Classification Search
   CPC ... H04N 2201/00; H04N 13/00; H04N 5/217
   USPC .................................................. 348/207.99
   See application file for complete search history.

(56) References Cited

U.S. PATENT DOCUMENTS

| 4,410,804 A | 10/1983 | Stauffer |
| 8,112,721 B2 | 2/2012 | Nakamura |
| 8,520,059 B2 | 8/2013 | Aoki |
| 8,599,283 B2 | 12/2013 | Matsunaga et al. |
| 8,629,921 B2 | 1/2014 | Nakamura et al. |
| 2002/0140835 A1* | 10/2002 | Silverstein ......... G02B 27/2214 348/340 |

(Continued)

FOREIGN PATENT DOCUMENTS

| CN | 101238490 A | 8/2008 |
| CN | 101573971 A | 11/2009 |

(Continued)

OTHER PUBLICATIONS

Joon Hong Park and Hyun Wook Park, "A Mesh-Based Disparity Representation Method for View Interpolation and Stereo Image Compression", Jul. 2006, IEEE Transactions on Image Processing, vol. 15, No. 7, p. 1751-1762.*

(Continued)

*Primary Examiner* — Sath V Perungavoor
*Assistant Examiner* — Clifford Hilaire
(74) *Attorney, Agent, or Firm* — Carter, DeLuca, Farrell & Schmidt, LLP

(57) ABSTRACT

An imaging element includes a plurality of photoelectric conversion units that output an image signal for each pixel through a micro lens. An imaging signal processing circuit separates image signals output from the imaging element into a left-eye image signal and a right-eye image signal. An image combining circuit generates combined image data by performing arithmetic average processing for left-eye image data and right-eye image data. A recording medium control I/F unit controls to record left-eye image data and right-eye image data for use in 3D display and combined image data for use in 2D display in different regions in an image file.

7 Claims, 24 Drawing Sheets

(56) References Cited

U.S. PATENT DOCUMENTS

| | | | |
|---|---|---|---|
| 2004/0247175 A1* | 12/2004 | Takano et al. | 382/154 |
| 2009/0073170 A1 | 3/2009 | Berretty et al. | |
| 2009/0080876 A1* | 3/2009 | Brusnitsyn | G03B 13/36 396/128 |
| 2010/0195920 A1* | 8/2010 | Tago | H04N 5/772 382/232 |
| 2010/0315517 A1 | 12/2010 | Nakamura et al. | |
| 2011/0007135 A1* | 1/2011 | Okada | G11B 27/322 348/46 |
| 2012/0002078 A1* | 1/2012 | Nakamura | H04N 5/772 348/231.2 |

FOREIGN PATENT DOCUMENTS

| | | |
|---|---|---|
| CN | 102065223 A | 5/2011 |
| JP | 58-24105 A | 2/1983 |
| JP | 2006013759 A | 1/2006 |
| JP | 2008-518317 A | 5/2008 |
| JP | 2008-141517 A | 6/2008 |
| JP | 2008-252493 A | 10/2008 |
| JP | 2008-299184 A | 12/2008 |
| JP | 2008-306645 A | 12/2008 |
| JP | 2008-310187 A | 12/2008 |
| JP | 2009-165115 A | 7/2009 |
| JP | 2010-200354 A | 9/2010 |
| WO | 2011/118089 A1 | 9/2011 |
| WO | 2011136190 A1 | 11/2011 |

OTHER PUBLICATIONS

Park, Joon Hong, and HyunWook Park. "A mesh-based disparity representation method for view interpolation and stereo image compression." Image Processing, IEEE Transactions on 15.7 (2006): 1751-1762.*

Standard of the Camera & Imaging Products Association, CIPA DC-009—Translation-2010; JEITA CP-3461B; Design rule for Camera File System, DCF Version 2.0 (Edition 2010) Established on Apr. 26, 2010.*

Japanese Office Action issued in corresponding application No. 2011264282 on Jul. 14, 2015.

Office Action issued in counterpart Chinese application No. 201210381242.0 on Sep. 11, 2014.

Japanese Office Action issued in corresponding application No. 2011264204 on Sep. 1, 2015.

Japanese Office Action issued in corresponding application No. 2011264204 on Apr. 5, 2016.

* cited by examiner

FIG. 11A
FIG. 11C
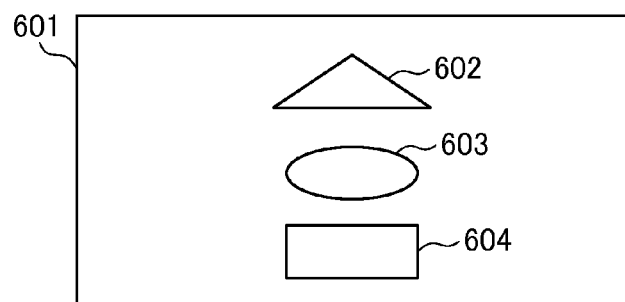
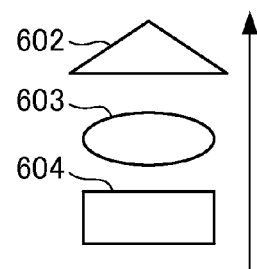
FIG. 11B
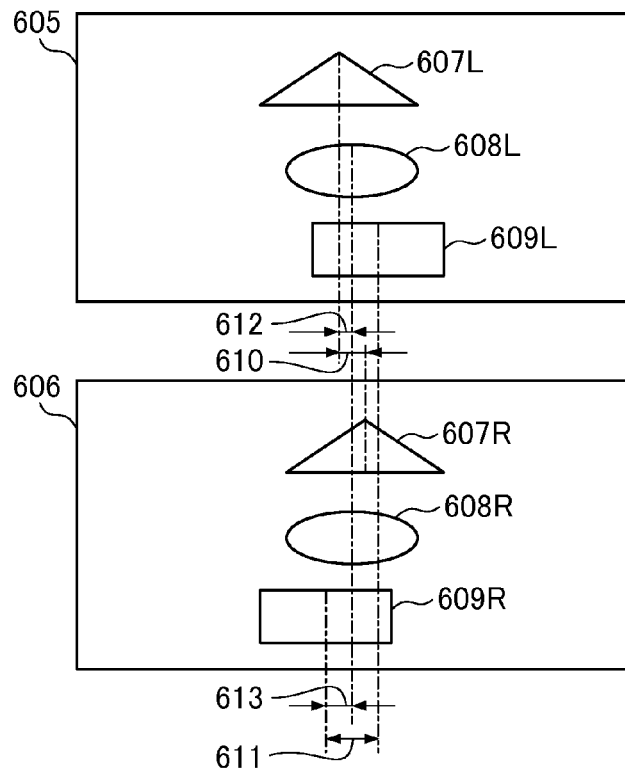

IMAGING APPARATUS AND METHOD FOR CONTROLLING SAME

BACKGROUND OF THE INVENTION

1. Field of the Invention

The present invention relates to an imaging apparatus and particularly relates to processing for recording image data for use in three-dimensional display (hereinafter also referred to as "3D display") and image data for use in two-dimensional display (hereinafter also referred to as "2D display") in a file.

2. Description of the Related Art

In recent years, there has been a rapid increase in the prevalence of devices associated with stereoscopic images such as three-dimensional (3D) cinema, 3D display, or the like. Conventionally, photographing stereoscopic images has been carried out by film cameras or the like. However, with the prevalence of digital imaging apparatuses, photographing original images for generating stereoscopic images using digital cameras, digital video cameras, or the like has become common.

As a mechanism by which a user views a stereoscopic image, data for a right-eye image and a left-eye image with parallax in the left-right direction is prepared so as to correspond to an image of the object viewed with the left eye and an image of the object viewed with the right eye. A user can view stereoscopic images by viewing the right-eye image and the left-eye image with his/her right eye and left eye, respectively. Examples of such a method include a method for dividing a parallax image to be viewed, such as a parallax barrier method, a lenticular method, or the like. Also, a method for providing different images to the left eye and the right eye of a user via a filter having different characteristics between the left and right sides thereof is known.

On the other hand, as a method for capturing an image which is viewable as a stereoscopic image, Japanese Patent Laid-Open No. 58-24105 discloses a method for simultaneously capturing images at different viewpoints. Japanese Patent Laid-Open No. 58-24105 discloses a solid-state imaging element in which a plurality of micro lenses is formed and at least one pair of photodiodes is arranged close to each of the micro lenses. Of the pair of photodiodes, a first image signal is obtained from the output of one photodiode and a second image signal is obtained from the output of the other photodiode. A user can view a stereoscopic image using the first and second image signals as a left-eye image signal and a right-eye image signal, respectively.

Although left-eye image data and right-eye image data can be managed as separate files, the following circumstance may occur for management of image data. In other words, the management of image data as separate files becomes complex as well as a stereoscopic image cannot be viewed if one of the files is lost. Accordingly, in the file generation method disclosed in Japanese Patent Laid-Open No. 2010-200354, left-eye image data and right-eye image data are recorded in the same file, and thus, efficient file management can be realized. In this case, a left-eye image or a right-eye image is used for two-dimensional display, whereas both of a left-eye image and a right-eye image are used for three-dimensional display.

Japanese Patent Laid-Open No. 2008-518317 discloses an output parallax map having an output element which has an output value corresponding to a shift to be applied to each pixel of a first image. A second image can be generated based on the output parallax map and the first image. This calculation is based on an input parallax map having input elements each having an input value and can generate a second image using the input image and the parallax map in order to render a multi-view image.

Assume the case where photographing is performed using the solid-state imaging element disclosed in Japanese Patent Laid-Open No. 58-24105 in which a plurality of micro lenses is formed and at least one pair of photodiodes is arranged close to each of the micro lenses. In the solid-state imaging element, one of a pair of photodiodes outputs a left-eye image signal which is obtained by photoelectrically converting a light flux having passed through a region of an exit pupil of an imaging optical system and the other outputs a right-eye image signal which is obtained by photoelectrically converting a light flux having passed through a region different from the aforementioned region of the exit pupil. In this case, depending on the type of an object, neither the left-eye image nor the right-eye image may be an image reflecting the shape of the object.

For example, in a photographic scene in which light from a point light source is photographed in a blurred manner, a photograph of the light source blurred in a circular pattern should be taken originally. However, when an image is captured by the solid-state imaging element disclosed in Japanese Patent Laid-Open No. 58-24105, the captured image may be in a semicircular or elliptical shape not reflecting the shape of an object. In addition, for example, the shape of the object which is captured as an image is photographed in a different way between the left-eye image and the right-eye image so that the left half of the object in the left-eye image is missing and the right half of the object in the right-eye image is missing. The reason for this is that, among the light fluxes emitted from the exit pupil of the imaging optical system, the region of light received by a photodiode is different along the optical axis serving as the boundary.

Even if such left-eye image data and right-eye image data are generated as one file using the technique disclosed in Japanese Patent Laid-Open No. 2010-200354, the imaging apparatus may display a two-dimensional image having an incorrect shape upon image replay.

In addition, even if there is an attempt to calculate a second image using the technique disclosed in Japanese Patent Laid-Open No. 2008-518317, an image reflecting the correct shape of an object cannot be obtained. In other words, an original image is photographed in a shape different from that of the actual object, and thus, the calculated second image cannot be reproduced as a correct image.

When a parallax map is used, an image file needs to be created in accordance with a file format compatible with a generally-used application. When a file including parallax map data and a file including image data are created separately, a plurality of files needs to be managed. In consideration of the usability of file management by a user, it is preferable that both data are enclosed in a single file.

SUMMARY OF THE INVENTION

Accordingly, the present invention provides an imaging apparatus that enhances reproducibility of a reproduction image by recording left-eye image data and right-eye image data for use in two-dimensional display and image data reflecting the correct shape of an object for use in two-dimensional display in the same file. Also, the present invention provides an imaging apparatus that is capable of reproducing an image reflecting the correct shape of an object using the image data and the parallax map included in the image file even in the case of the two-dimensional display or the three-dimensional display.

According to an aspect of the present invention, an imaging apparatus is provided that has an imaging element comprising a plurality of photoelectric conversion units configured to output a plurality of image signals by photoelectrically converting light fluxes each having passed through a different region of an exit pupil of an imaging optical system and records data in an image file by processing the plurality of image signals by means of the imaging element. The imaging apparatus includes a signal processing unit configured to acquire left-eye image data and right-eye image data from the image signals output from the imaging element and generate combined image data for two-dimensional display by additively combining the left-eye image data and the right-eye image data; and a recording control unit configured to control to record the left-eye image data, the right-eye image data, and the combined image data generated by the signal processing unit in different regions of the image file.

Further features of the present invention will become apparent from the following description of exemplary embodiments with reference to the attached drawings.

BRIEF DESCRIPTION OF THE DRAWINGS

FIGS. 11A to 11C are diagrams illustrating an example of parallax map generation processing.

DESCRIPTION OF THE EMBODIMENTS

Figure 1:
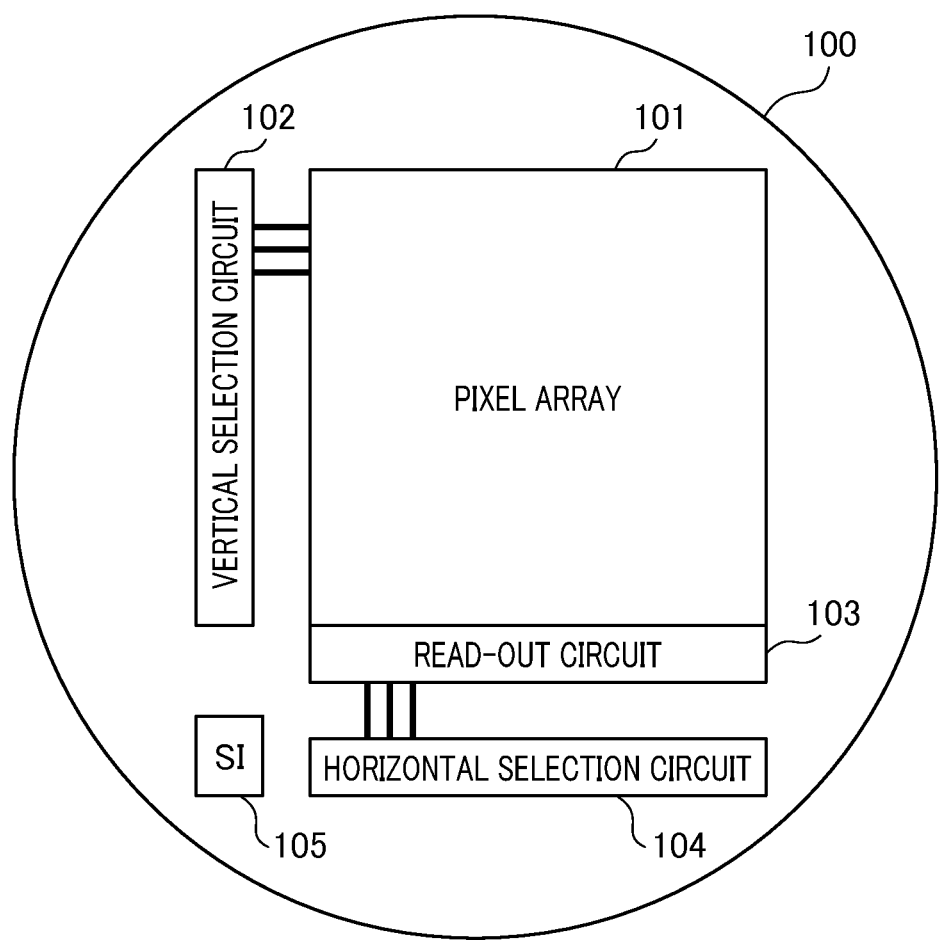
FIG. 1 is a diagram schematically illustrating the general configuration of an imaging element according to an embodiment of the present invention.

FIG. 1 is a diagram schematically illustrating an exemplary configuration of an imaging element that is applied to the imaging apparatus according to one embodiment of the present invention. An imaging element 100 includes a pixel array 101, a vertical selection circuit 102 that selects a row in the pixel array 101, and a horizontal selection circuit 104 that selects a column in the pixel array 101. A read-out circuit 103 reads a signal of a pixel which has been selected from the pixels in the pixel array 101 by the vertical selection circuit 102. The read-out circuit 103 has a memory for accumulating signals, a gain amplifier, an AD converter, or the like for each column.

A serial interface (SI) unit 105 determines the operation mode of each circuit in accordance with the instructions given by an external circuit. The vertical selection circuit 102 sequentially selects a plurality of rows of the pixel array 101 so that a pixel signal(s) is extracted to the read-out circuit 103. Also, the horizontal selection circuit 104 sequentially selects a plurality of pixel signals read by the read-out circuit 103 for each row. Note that the imaging element 100 includes a timing generator that provides a timing signal to the vertical selection circuit 102, the horizontal selection circuit 104, the read-out circuit 103, and the like, a control circuit, and the like in addition to the components shown in FIG. 1, but no detailed description thereof will be given.

Figure 2A:
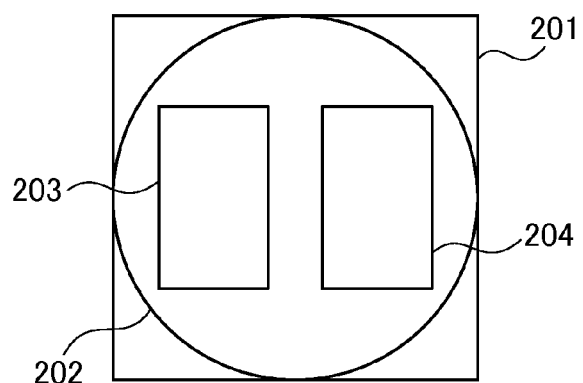
FIG. 2A is a diagram illustrating the configuration of one pixel of an imaging element.
Figure 2B:
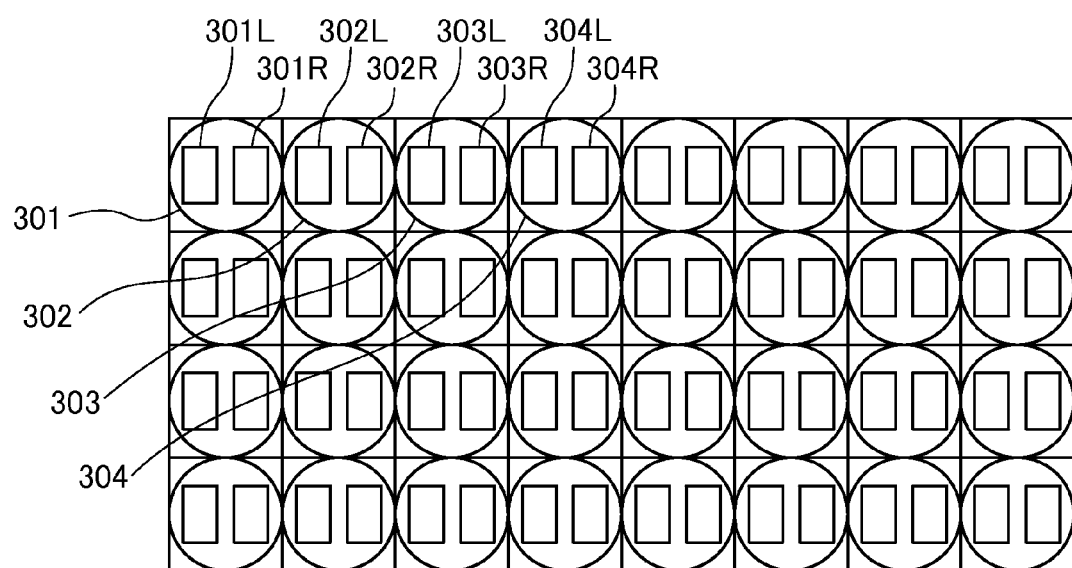
FIG. 2B is a diagram illustrating an exemplary configuration of a plurality of pixels of an imaging element.

FIGS. 2A and 2B are diagrams illustrating an exemplary configuration of a pixel of the imaging element 100. FIG. 2A schematically shows the configuration of one pixel. FIG. 2B shows the arrangement of the pixel array 101. A pixel 201 shown in FIG. 2A has a micro lens 202 serving as an optical element and a plurality of photodiodes (hereinafter abbreviated as "PD") serving as light receiving elements.

Although FIG. 2A shows an example in which a left-side PD 203 and a right-side PD 204 are provided for one pixel, three or more (e.g., four or nine) PDs may also be used. The PD 203 photoelectrically converts the received light flux to thereby output a left-eye image signal. The PD 204 photoelectrically converts the received light flux to thereby output a right-eye image signal. Note that the pixel 201 also includes a pixel amplifier for extracting a PD signal to the read-out circuit 103, a row selection switch, a reset switch for resetting a PD signal, and the like in addition to the components shown in FIG. 2A.

In order to provide a two-dimensional image, the pixel array 101 is arranged in a two-dimensional array such as a plurality of pixels 301, 302, 303, and 304 as shown in FIG. 2B. Each of PDs 301L, 302L, 303L, and 304L corresponds to the PD 203 shown in FIG. 2A. Also, each of PDs 301R, 302R, 303R, and 304R corresponds to the PD 204 shown in FIG. 2A. In other words, the imaging element for use in the present embodiment includes a plurality of pixels each having a first photoelectric conversion unit (PD 203) configured to output a left-eye image signal and a second photoelectric conversion unit (PD 204) configured to output a right-eye image signal.

Figure 3:
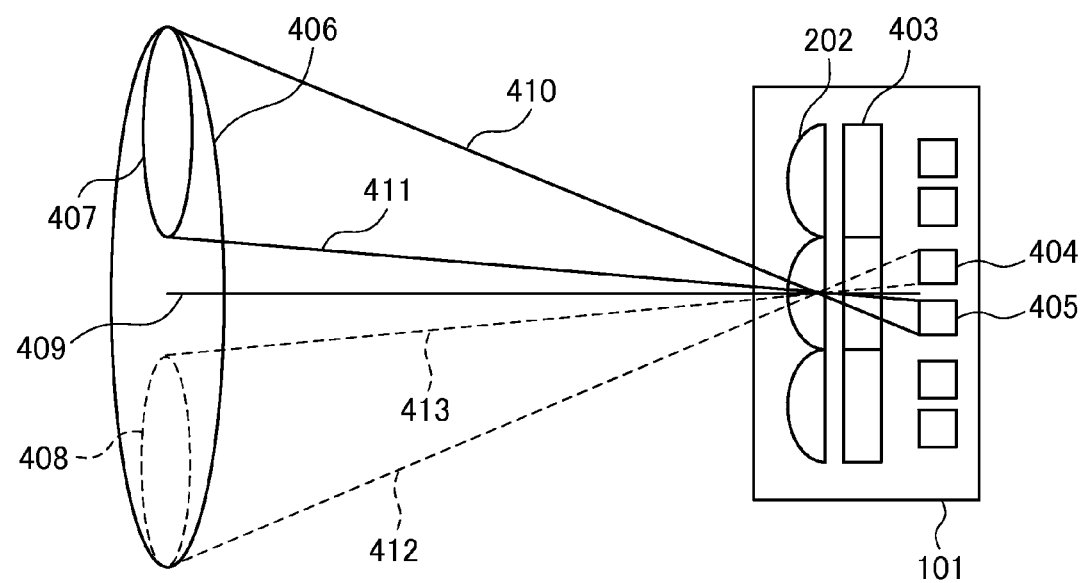
FIG. 3 is a conceptual diagram illustrating how light fluxes emitted from the exit pupil of a photographing lens enter an imaging element.

Next, a description will be given of the light receiving of the imaging element 100 having the pixel configuration shown in FIG. 2B. FIG. 3 is a conceptual diagram illustrating how light fluxes emitted from the exit pupil of a photographing lens enter the imaging element 100. The pixel array 101 has a micro lens 202, a color filter 403, and PDs 404 and 405. The PDs 404 and 405 correspond to the PDs 203 and 204 shown in FIG. 2A, respectively.

In FIG. 3, the center axis of the light flux emitted from an exit pupil 406 of a photographing lens to the micro lens 202 is an optical axis 409. The light emitted from the exit pupil 406 enters the imaging element 100 centered on the optical axis 409. Each of the partial regions 407 and 408 is a region of the exit pupil 406 of the photographing lens. Light beams 410 and 411 are the outermost peripheral light beams of light passing through the partial region 407. Light beams 412 and 413 are the outermost peripheral light beams of light passing through the partial region 408.

Among the light fluxes emitted from the exit pupil 406, the upper light flux enters the PD 405 and the lower light flux enters the PD 404, with the optical axis 409 serving as the boundary. In other words, each of the PDs 404 and 405 receives a light flux emitted from a different region of the exit pupil of the photographing optical system. In this manner, each of the light receiving elements (PDs 404 and 405) detects light that has passed through a different region of the exit pupil. Thus, in the case where light from a point light source is photographed in a blurred manner, each of the light receiving elements obtains a photographed image with a different shape.

Figure 4:
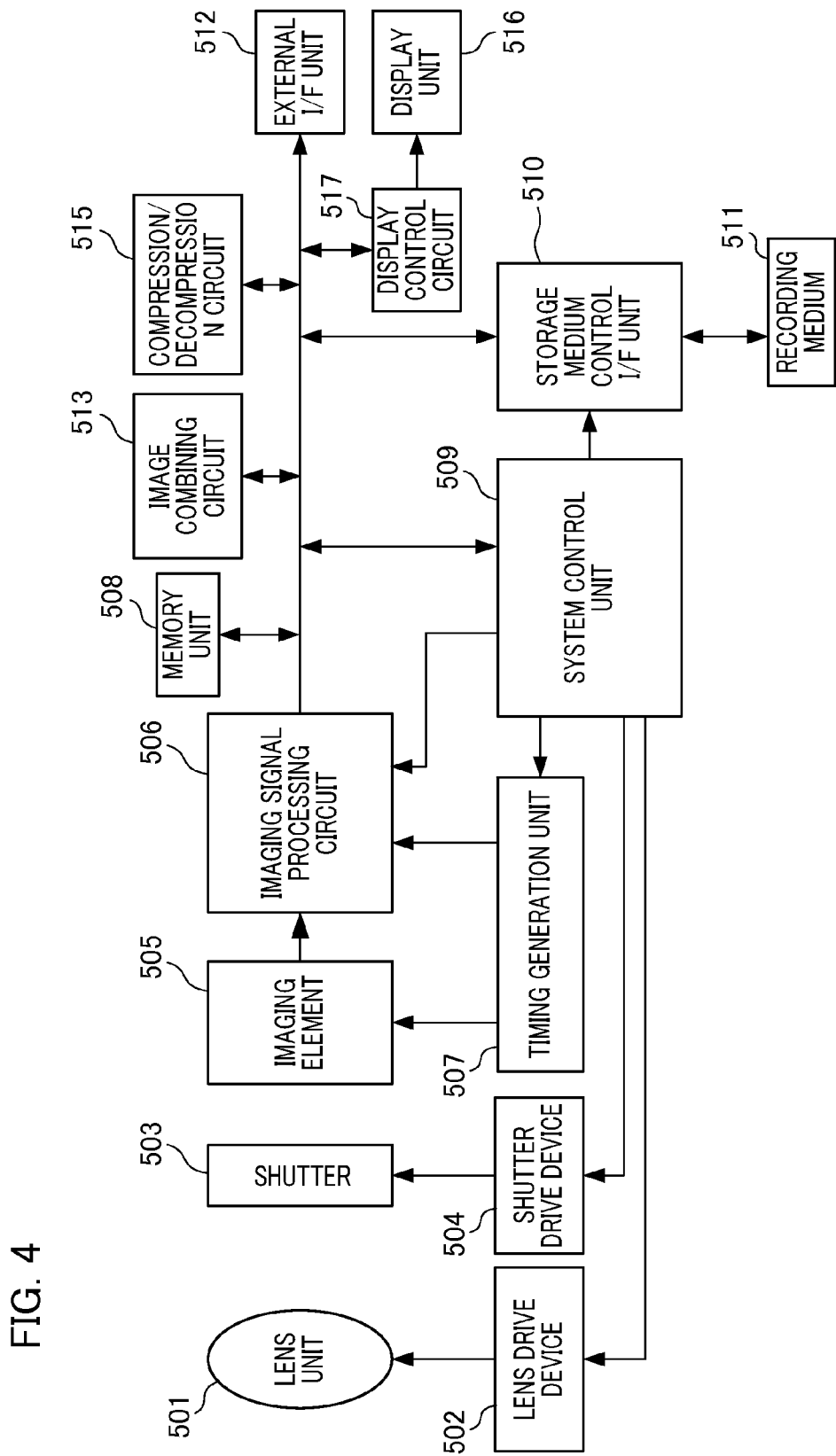
FIG. 4 is a diagram illustrating an exemplary configuration of an imaging apparatus according to an embodiment of the present invention.

FIG. 4 is a diagram illustrating an exemplary configuration of an imaging apparatus of the present embodiment. With reference to FIG. 4, a description will be given of an exemplary application of the imaging element 100 shown in FIG. 1 to a digital camera. A lens unit 501 constituting the imaging optical system focuses the light reflected from an object on an imaging element 505. The imaging element 505 corresponds to the imaging element 100 shown in FIG. 1 and has the pixel configuration shown in FIG. 2B. A lens drive device 502 executes zoom control, focus control, diaphragm control, or the like. A mechanical shutter 503 is controlled by a shutter drive device 504. The imaging element 505 converts an object image focused by the lens unit 501 into an image signal. An imaging signal processing circuit 506 performs various kinds of processing (pixel interpolation processing, color conversion processing, or the like) or correction on the image signal output by the imaging element 505. A timing generation unit 507 outputs a timing signal required for the imaging element 505 or the imaging signal processing circuit 506.

A system control unit 509 is a control unit that performs various computations and controls the imaging apparatus overall. A CPU (Central Processing Unit) (not shown) provided therein interprets and executes a program to thereby perform various kinds of processing. Note that the system control unit 509 can perform AF (Auto Focus) control by detecting a phase difference between left-eye image data and right-eye image data.

A memory unit 508 includes a memory that temporarily stores image data. A recording medium control interface unit (hereinafter abbreviated as "I/F unit") 510 which performs recording control is provided for recording/reading image data or the like in/from a recording medium 511. The recording medium 511 which is detachable from the imaging apparatus is a semiconductor memory or the like. An external I/F unit 512 transmits/receives data to/from an external device such as a computer device or the like so that a user can process an image. Also, a user can operate a digital camera using an operation unit (not shown) connected to the external I/F unit 512.

The image combining circuit 513 performs arithmetic average processing for image data output from the imaging element 505 for each pixel and performs processing for acquiring only the required PD signals. In the example shown in FIG. 2, for the pixel signals 301L, 301R, 302L, 302R, 303L, 303R, 304L, and 304R output from the PDs, the pixel signals extracted from the outputs of the left-side PDs only are 301L, 302L, 303L, and 304L, whereas the pixel signals extracted from the output of the right-side PDs only are 301R, 302R, 303R, and 304R. Combined image data is created from ((301L+301R)/2, (302L+302R)/2, (303L+303R)/2, and (304L+304R)/2) which are obtained by arithmetically averaging the outputs of the left-side PDs and the right-side PDs. Note that only addition processing may be performed during addition combination processing and division processing and adjustment of the dynamic range may be performed during post processing.

A compression/decompression circuit 515 compresses image data stored in the memory unit 508 in accordance with a predetermined image compression method (e.g., adaptive discrete cosine transform (ADCT)). Also, the compression/decompression circuit 515 has a function of writing the compressed image data to the memory unit 508 and a function of decompressing image data read out from the memory unit 508 and writing the decompressed image data to the memory unit 508. A display unit 516 displays various pieces of information and a photographed image in accordance with display data from a display control circuit 517. The imaging signal processing circuit 506 performs image processing by allocating imaging data output from the imaging element 505 to the respective data for a left-eye image and a right-eye image. The memory unit 508 stores the output data output from the imaging signal processing circuit 506, the combined image data generated by an image combining circuit 513, and the like.

Next, a description will be given of the operation of a digital camera during photographing. When the main power supply of an imaging apparatus is turned ON, the power supply of a control system circuit unit is turned ON and the power supply of an imaging processing system circuit such as the imaging signal processing circuit 506 is also turned ON. When a user operates a release button (not shown), the system control unit 509 computes focus state detection based on data from the imaging element 505 to thereby calculate the distance between the imaging apparatus and the object. Then, the lens drive device 502 drives the movable lens of the lens unit 501 and the system control unit 509 determines whether or not the focus state is in-focus.

When the system control unit 509 determines that the focus state is not in-focus, the system control unit 509 controls the drive of the lens unit 501 again to thereby execute focus state detection processing. For computation of the distance between the imaging apparatus and the object, besides a method for calculating the distance from data obtained by the imaging element 505, a method for computing the distance using a distance measuring dedicated device (not shown) may also be used. The system control unit 509 starts the photographing operation after determination that the focus state is in-focus. When the photographing operation has been completed, the imaging signal processing circuit 506 processes the image signal output from the imaging element 505, and the system control unit 509 controls the writing of the image data to the memory unit 508.

Imaging data output from the imaging element 505 is output as image signals from a plurality of PDs. In the example shown in FIG. 2B, image signals are output in the order of the PDs 301L, 301R, 302L, 302R, 303L, 303R, 304L, and 304R. The imaging signal processing circuit 506 performs image processing by allocating imaging data output from the imaging element 505 to left-eye image data and right-eye image data. Left eye image data is image data obtained as a result of selecting and processing only the output from the left-side PDs 301L, 302L, 303L, and 304L shown in FIG. 2B. Also, right-eye image data is image data obtained as a result of selecting and processing only the output from the right-side PDs 301R, 302R, 303R, and 304R shown in FIG. 2B. Left eye image data and right-eye image data are separately held in the memory unit 508.

The image combining unit 513 reads the respective data for a left-eye image and a right-eye image held in the memory unit 508 to thereby generate a combined image data. The generated combined image data is stored in the memory unit 508. Image processing executed by the image combining unit 513 is processing for calculating an arithmetic average value for each pixel of a left-eye image and a right-eye image. Thus, the combined image generated by image processing has a shape reflecting the shape of an object. In other words, even when an object is photographed with the imaging element 505 in a state where the shape of the object is different between a left-eye image and a right-eye image, the shape of the object image is interpolated by image processing performed by the image combining unit 513, resulting in the generation of image data in a correct shape. For example, if an object has a circular shape and both a left-eye image and a right-eye image do not have a circular shape, the combined image has the same circular shape as that of the object.

In the exemplary configuration shown in FIG. 4, the imaging signal processing circuit 506 performs processing for dividing image data obtained by the imaging element 505 into left-eye image data and right-eye image data and the image combining circuit 513 performs processing for combining both image data. The present invention is not limited thereto, but the imaging signal processing circuit 506 may also be adapted to combine left-eye image data with right-eye image data both subjected to image processing.

The memory unit 508 accumulates left-eye image data, right-eye image data, and combined image data generated by the image combining circuit 513. The system control unit 509 controls to record data in a detachable recording medium 511 such as a semiconductor memory or the like via a recording medium control I/F unit 510. Alternatively, a user can perform image processing by outputting image data to an external device such as a computer via the external I/F unit 512.

(First Embodiment)

Hereinafter, a description will be given of a first embodiment of the present invention. In the first embodiment, a system configuration is provided that is capable of outputting combined image data, right-eye image data, and left-eye image data when RAW image data for the left and right PDs, i.e., all of the PDs is input to the imaging signal processing circuit 506. The term "RAW image" means an image obtained from data for each of the pixels of the imaging element 505, i.e., an image prior to image processing such as development processing or the like.

Figure 5:
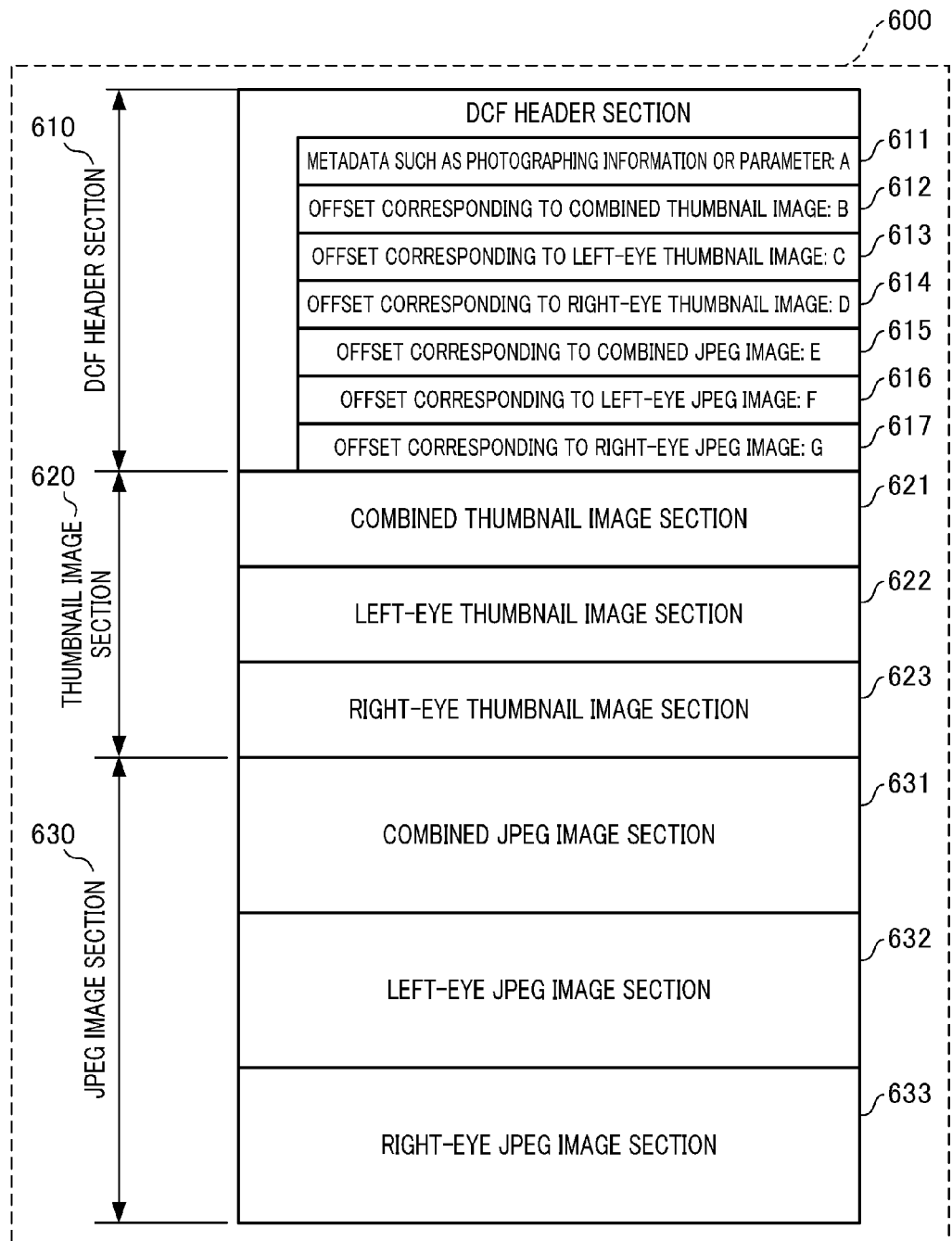
FIG. 5 is a diagram illustrating an example of a file structure according to a first embodiment of the present invention.

FIG. 5 is a diagram illustrating an exemplary file structure of image data according to the present embodiment. An image data file 600 is a DCF image data file that is generally used for a digital camera. The term "DCF" (Design rule for Camera File system) refers to an image file format for handling image data in a digital camera using a common specification. The image data file 600 has the regions including a DCF header section 610, a thumbnail image section 620, and a JPEG image section 630, where JPEG is an abbreviation for "Joint Photographic Experts Group".

The DCF header section 610 is a region, in which a predetermined data size is given in advance, for storing DCF header information. The DCF header information includes the following supplementary information and offset information for specifying a region for storing each image data (The number in parentheses denotes a reference numeral).

Metadata A (611): photographing information, parameters, and the like regarding image data stored in the JPEG image section 630.

Offset value B (612): offset data corresponding to the head position of a combined thumbnail image section 621.

Offset value C (613): offset data corresponding to the head position of a left-eye thumbnail image section 622.

Offset value D (614): offset data corresponding to the head position of a right-eye thumbnail image section 623.

Offset value E (615): offset data corresponding to the head position of a combined JPEG image section 631.

Offset value F (616): offset data corresponding to the head position of a left-eye JPEG image section 632.

Offset value G (617): offset data corresponding to the head position of a right-eye JPEG image section 633.

Each of the offset values B, C, D, E, F, and G is relative position information between the reference position of the DCF header section 610 and the calculated position of each image section, and the starting position of each image data stored in an image file is specified using each of these values.

The thumbnail image section 620 is a region for storing thumbnail image data which is resized by thinning JPEG image data or the like stored in the JPEG image section 630. Thumbnail image data is used, for example, when a plurality of reduced images is displayed on the screen of the display unit 516 (when index display is performed). Thumbnail image data for use in 2D display is recorded in the combined thumbnail image section 621. Thumbnail left-eye image data and thumbnail right-eye image data for use in 3D display are recorded in the left-eye thumbnail image section 622 and the right-eye thumbnail image section 623, respectively.

The JPEG image section 630 is a region for storing JPEG image data which is obtained by compressing RAW image data subjected to image processing by the compression/decompression circuit 515. The image data is data which can be handled by many generally-used applications. JPEG image data for use in 2D display is recorded in the combined JPEG image section 631. JPEG left-eye image data and JPEG right-eye image data for use in 3D display are recorded in the left-eye JPEG image section 632 and the right-eye JPEG image section 633, respectively. The aforementioned file structure is merely an example, and the file structure in which the arrangement order of image sections is changed depending on various applications such as image editing or the like may also be used.

Figure 6:
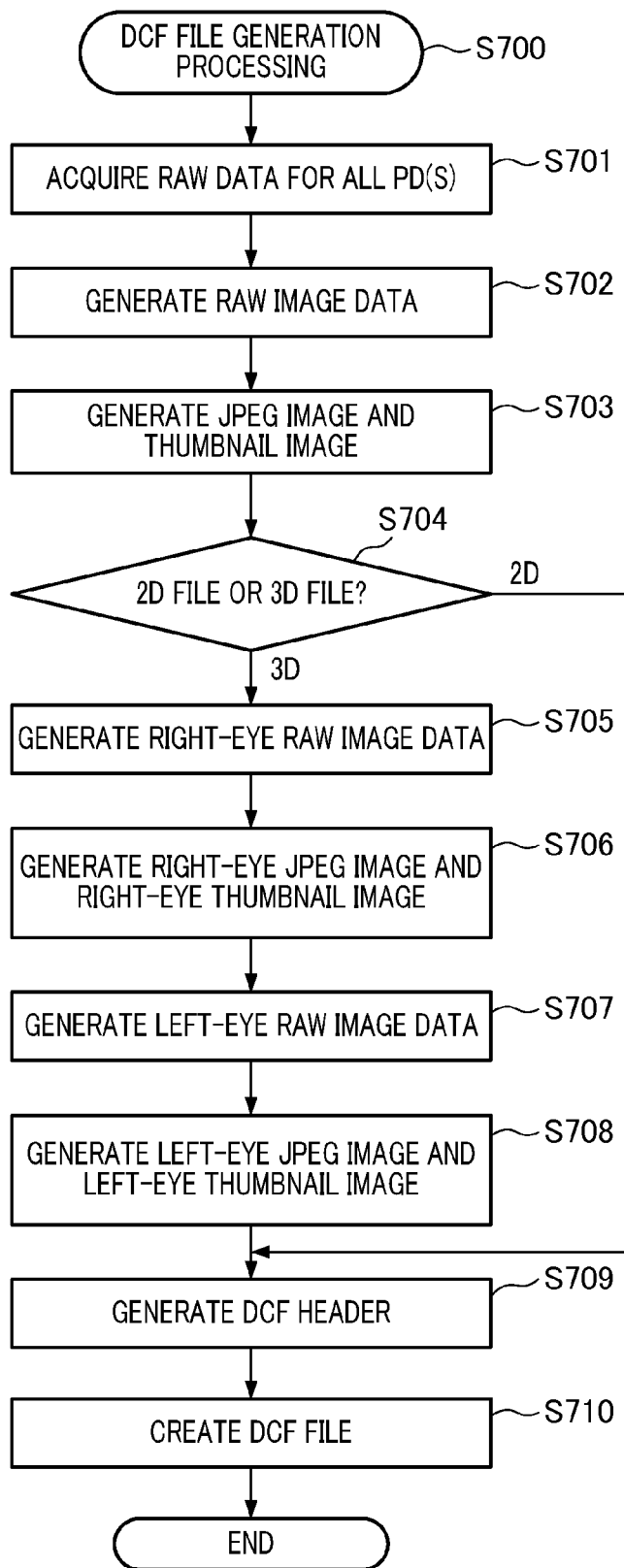
FIG. 6 is a flowchart illustrating an example of file generation processing according to the first embodiment of the present invention.

FIG. 6 is a basic flowchart illustrating DCF file generation processing performed by a digital camera. When the process starts in step S700, RAW data for all of the combined PDs of the right-side PDs and the left-side PDs, which has been read out from the imaging element 505, is expanded on the memory unit 508 in step S701, and the process advances to step S702. In step S702, the imaging signal processing circuit 506 performs image processing for RAW image data on the memory unit 508 using the development parameters for a RAW image, and the output image data is arranged on the memory unit 508. Then, the process advances to step S703. Since the signals read out from all of the PDs are used for a RAW image, the RAW image for an object can be recognized as image data reflecting the correct shape of the object even when light from the aforementioned point light source is photographed in a blurred manner. For convenience, an image generated by addition combination processing using all of the combined PDs of the right-side PDs and the left-side PDs is referred to as a "combined image". A combined image for a RAW image is referred to as a "combined RAW image", a combined image for a JPEG image is referred to as a "combined JPEG image", and a combined image for a thumbnail image is referred to as a "combined thumbnail image". Note that addition combination processing is intended to include arithmetic average processing.

In step S703, the combined RAW image data obtained in step S702 is input to the imaging signal processing circuit 506, and development processing for the combined RAW image data is performed using the development parameters for a JPEG image. Furthermore, combined JPEG image data and combined thumbnail image data are generated by a predetermined image compression, and the process advances to step S704. It is determined in step S704 whether a 2D image file or a 3D image file is generated. When a 3D image file is generated, the process advances to step S705, whereas when a 2D image file is generated, the process advances to step S709. Note that the term "3D image file" defined herein refers to a file in a format which can handle both an image for 3D display and an image for 2D display.

In step S705, RAW data for all of the PDs obtained in step S701 is input to the imaging signal processing circuit 506, and RAW image data corresponding to the right-side PDs is extracted. The imaging signal processing circuit 506 performs image processing for the extracted RAW image data using the development parameters for a RAW image and outputs right-eye RAW image data to the memory unit 508. Then, the process advances to step S706. In step S706, the right-eye RAW image data expanded on the memory unit 508 is input to the imaging signal processing circuit 506, and image processing for the right-eye RAW image data is performed using the development parameters for a JPEG image. Furthermore, right-eye JPEG image data and right-eye thumbnail image data are generated by a predetermined image compression, and the process advances to step S707.

In step S707, RAW data for all of the PDs obtained in step S701 is input to the imaging signal processing circuit 506, and RAW image data corresponding to the left-side PDs is extracted. The imaging signal processing circuit 506 performs image processing for the extracted RAW image data using the development parameters for a RAW image and outputs left-eye RAW image data to the memory unit 508. Then, the process advances to step S708. In step S708, the left-eye RAW image data expanded on the memory unit 508 is input to the imaging signal processing circuit 506, and development processing for the left-eye RAW image data is performed using the development parameters for a JPEG image. Furthermore, left-eye JPEG image data and left-eye thumbnail image data are generated by a predetermined image compression, and the process advances to step S709.

In step S709, information indicating a shutter speed, an exposure time, and the like during photographing is set as metadata A (see reference numeral 611 shown in FIG. 5). Next, the offset values B to G (see reference numerals 612 to 617 shown in FIG. 5) corresponding to the image sections are calculated on the basis of the data sizes of the images generated until step S709, and these values are set. In this manner, data for the DCF header section 610, including the metadata A and the offset values B to G, is created on the memory unit 508, and the process advances to step S710. In step S710, data for the DCF header section 610 created in step S709, data for the JPEG images, and data for the thumbnail images are coupled as one DCF file having the structure described in FIG. 5, and DCF file generation processing is ended.

On the other hand, if it is determined in step S704 that a 2D image file is generated, the process advances to step S709. In step S709, metadata A (see reference numeral 611 shown in FIG. 5) regarding photographing information, parameters, and the like is set and the offset values B (see reference numeral 612) and E (see reference numeral 615) corresponding to the combined images are calculated and set. Here, a predetermined value (e.g., "0") indicating that an image is not included in the image data file 600 is set for the offset values C (see reference numeral 613) and F (see reference numeral 616) corresponding to right-eye images and the offset values D (see reference numeral 614) and G (see reference numeral 617) corresponding to left-eye images. Alternatively, when a method for not recording the items of the offset values is employed, the DCF header section 610 not having regions corresponding to the items is created, and the process advances to step S710. In step S710, a DCF file is generated from data for the DCF header section 610, combined JPEG image data, and combined thumbnail image data, and a series of DCF file generation processing is ended. The structure of a 2D display file is the same as that of a conventional DCF file, and thus, a detailed description thereof will be omitted.

In the first embodiment, right-eye image data, left-eye image data, and combined image data by additively combining these image data are generated from the outputs of all of the PDs in the imaging element, and thus, image data reflecting the correct shape of an object can be recorded in a file as a two-dimensional display image. In other words, a file including not only left-eye image data and right-eye image data where an object is viewed from different directions but also combined image data for reproducing the correct shape of the object by additively combining these image data is obtained.

(Variant Example of First Embodiment)

Next, a description will be given of a variant example of the first embodiment of the present invention. In the variant example, RAW data for the right-side PDs and the left-side PDs is input to the imaging signal processing circuit 506, and thus, right-eye image data and left-eye image data are output. The right-eye image data and the left-eye image data are output as combined image data by the image combining circuit 513. The file structure in the variant example is the same as that of the first embodiment (see FIG. 5).

Figure 7:
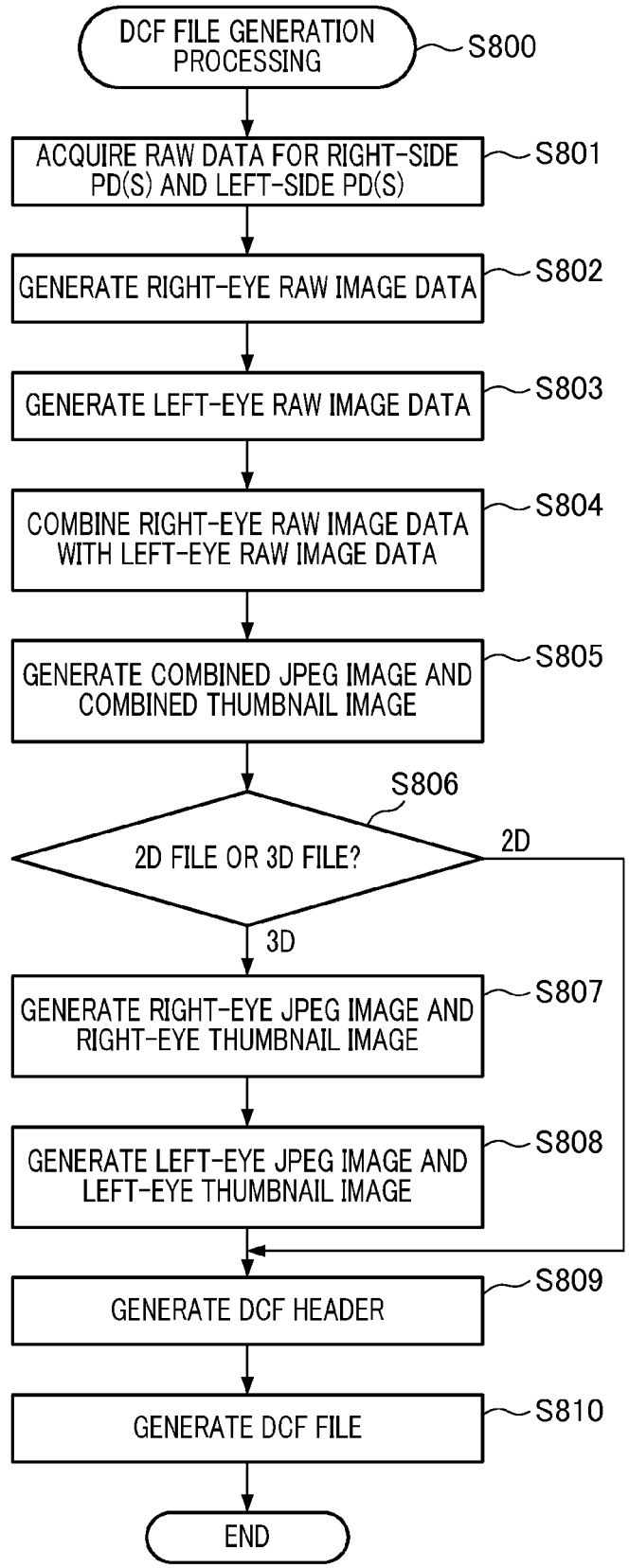
FIG. 7 is a flowchart illustrating another example of file generation processing according to the first embodiment of the present invention.

FIG. 7 is a basic flowchart illustrating DCF file generation processing according to a variant example of the first embodiment. When the process starts in step S800, RAW data for the right-side PDs and the left-side PDs, which has been read out from the imaging element 505, is expanded on the memory unit 508 in step S801, and the process advances to step S802. In step S802, RAW data for the right-side PDs on the memory unit 508 is extracted, and the imaging signal processing circuit 506 performs image processing using the development parameters for a RAW image. The output right-eye RAW image data is arranged on the memory unit 508, and the process advances to step S803. In step S803, RAW data for the left-side PDs on the memory unit 508 is extracted, and the imaging signal processing circuit 506 performs image processing using the development parameters for a RAW image. The output left-eye RAW image data is arranged on the memory unit 508, and the process advances to step S804.

In step S804, right-eye RAW image data and left-eye RAW image data are input to the image combining circuit 513. The image combining circuit 513 performs arithmetic average processing for both RAW image data for each pixel to thereby generate combined RAW image data, and the generated combined RAW image data is arranged on the memory unit 508. Then, the process advances to step S805. Since interpolation processing relating to the shape of an object is performed for image data subjected to addition combination processing, the RAW image data for the object can be recognized as image data reflecting the correct shape of the object even when light from the aforementioned point light source is photographed in a blurred manner. In step S805, the combined RAW image data obtained in step S804 is input to the imaging signal processing circuit 506, and development processing for the combined RAW image data is performed using the development parameters for a JPEG image. Furthermore, combined JPEG image data and combined thumbnail image data are generated by a predetermined image compression, and the process advances to step S806.

It is determined in step S806 whether a 2D image file or a 3D image file is generated. When a 3D image file is generated, the process advances to step S807, whereas when a 2D image file is generated, the process advances to step S809. In step S807, the right-eye RAW image data obtained in step S802 is input to the imaging signal processing circuit 506, and development processing for the right-eye RAW image data is performed using the development parameters for a JPEG image. Furthermore, right-eye JPEG image data and right-eye thumbnail image data are generated by a predetermined image compression, and the process advances to step S808.

In step S808, the left-eye RAW image data obtained in step S803 is input to the imaging signal processing circuit 506, and development processing for the left-eye RAW image data is performed using the development parameters for a JPEG image. Furthermore, left-eye JPEG image data and left-eye thumbnail image data are generated by a predetermined image compression, and the process advances to step S809. In step S809, information indicating a shutter speed, an exposure time, and the like during photographing is set as metadata A (see reference numeral 611 shown in FIG. 5). Next, the offset values B to G (see reference numerals 612 to 617 shown in FIG. 5) corresponding to the image sections are calculated on the basis of the data sizes of the images generated until step S809, and these values are set. In this manner, data for the DCF header section 610, including the metadata A and the offset values B to G for photographing information, is created on the memory unit 508, and the process advances to step S810. In step S810, data for the DCF header section 610 created in step S809, data for the JPEG images, and data for the thumbnail images are coupled as one DCF file having the structure described in FIG. 5, and DCF file generation processing is ended.

On the other hand, if it is determined in step S806 that a 2D image file is generated, the process advances to step S809. In step S809, metadata A (see reference numeral 611 shown in FIG. 5) regarding photographing information, parameters, and the like is set and the offset values B (see reference numeral 612) and E (see reference numeral 615) corresponding to the combined images are calculated and set. Here, a predetermined value indicating that an image is not included in the image data file 600 is set to the offset values C (see reference numeral 613), D (see reference numeral 614), F (see reference numeral 616), and G (see reference numeral 617). Alternatively, the DCF header section 610 is created without recording the items of the offset values in the image file, and the process advances to step S810.

As described above, in the variant example, right-eye image data and left-eye image data are generated by the right-side PDs and the left-side PDs, respectively, and combined image data is generated on the basis of both image data. Consequently, image data reflecting the correct shape of an object can be recorded in a file as a two-dimensional display image.

(Another Variant Example of First Embodiment)

Figure 8:
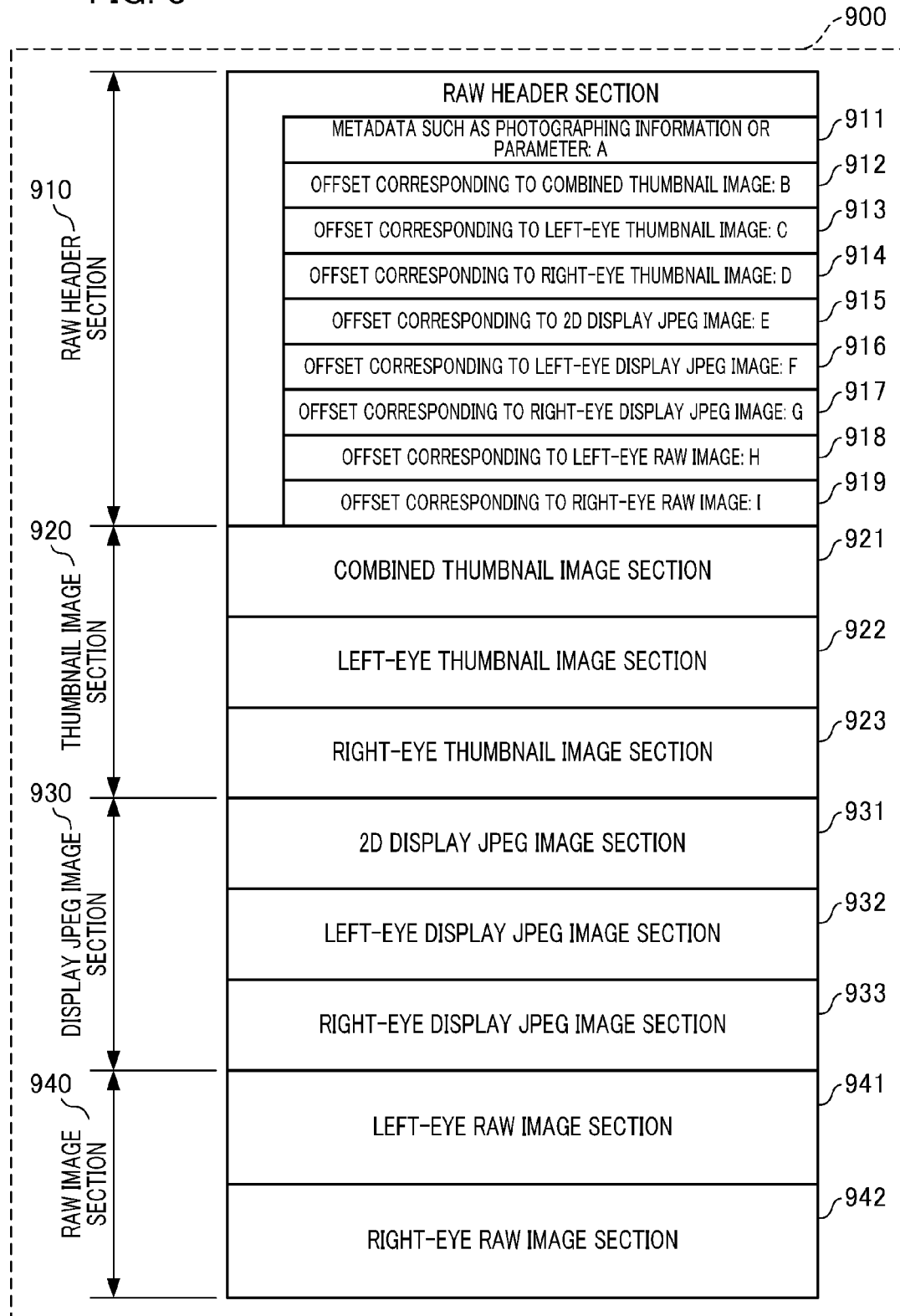
FIG. 8 is a diagram illustrating another example of a file structure according to the first embodiment of the present invention.

Next, a description will be given of another variant example of the first embodiment of the present invention. In the variant example, combined image data, right-eye image data, left-eye image data, and RAW image data are enclosed in the same file. FIG. 8 is a diagram illustrating an exemplary file structure of image data according to another variant example. An image data file 900 consists of the regions including a RAW header section 910, a thumbnail image section 920, a display JPEG image section 930, and a RAW image section 940.

The RAW header section 910 is a region, in which a predetermined data size is given in advance, for storing RAW header information. RAW header information includes the following supplementary information and offset information for specifying a region for storing each image data (The number in parentheses denotes a reference numeral).

Metadata A (911): photographing information, parameters, and the like regarding image data stored in the RAW image section 940.

Offset value B (912): offset data corresponding to the head position of a combined thumbnail image section 921.

Offset value C (913): offset data corresponding to the head position of a left-eye thumbnail image section 922.

Offset value D (914): offset data corresponding to the head position of a right-eye thumbnail image section 923.

Offset value E (915): offset data corresponding to the head position of a 2D display JPEG image section 931.

Offset value F (916): offset data corresponding to the head position of a left-eye display JPEG image section 932.

Offset value G (917): offset data corresponding to the head position of a right-eye display JPEG image section 933.

Offset value H (918): offset data corresponding to the head position of a left-eye RAW image section 941.

Offset value I (919): offset data corresponding to the head position of a right-eye RAW image section 942.

The starting position of each image data stored in an image file is specified using each of the offset values B, C, D, E, F, G, H, and I.

The thumbnail image section 920 is a region for storing thumbnail image data which is resized by thinning a JPEG image or the like stored in the display JPEG image section 930. Thumbnail image data is used, for example, when a plurality of reduced images is displayed on the image display section of an external device such as a personal computer or the like (when index display is performed). Thumbnail image data for use in 2D display is recorded in the combined thumbnail image section 921. Thumbnail left-eye image data and thumbnail right-eye image data for use in 3D display are recorded in the left-eye thumbnail image section 922 and the right-eye thumbnail image section 923, respectively.

The display JPEG image section 930 is a region for storing JPEG image data which is obtained by compressing RAW image data stored in the RAW image section 940 in a predetermined manner. The JPEG image data is typically used as a reference for the confirmation of images and can be handled by many applications. JPEG image data for use in 2D display is recorded in the 2D display JPEG image section 931. Display JPEG left-eye image data and display JPEG right-eye image data for use in 3D display are recorded in the left-eye display JPEG image section 932 and the right-eye display JPEG image section 933, respectively.

The RAW image section 940 is a region for storing RAW image data which is output from the imaging element 505 without degradation. Since the RAW image data can be subjected to image reproduction processing (development) by an external device such as a personal computer or the like, a high-quality print or high-level image editing that meets the objectives of a user can be performed. In contrast, since a RAW image has a large amount of data and is not suitable for image display or the like, image data in the display JPEG image section 930 is used upon actual 3D display. Thus, only RAW data may be recorded as material data in the RAW image section 940 in order to suppress the amount of data. In the variant example, RAW image data obtained from the left-side PDs is recorded in the left-eye RAW image section 941, and RAW image data obtained from the right-side PDs is recorded in the right-eye RAW image section 942.

Figure 9:
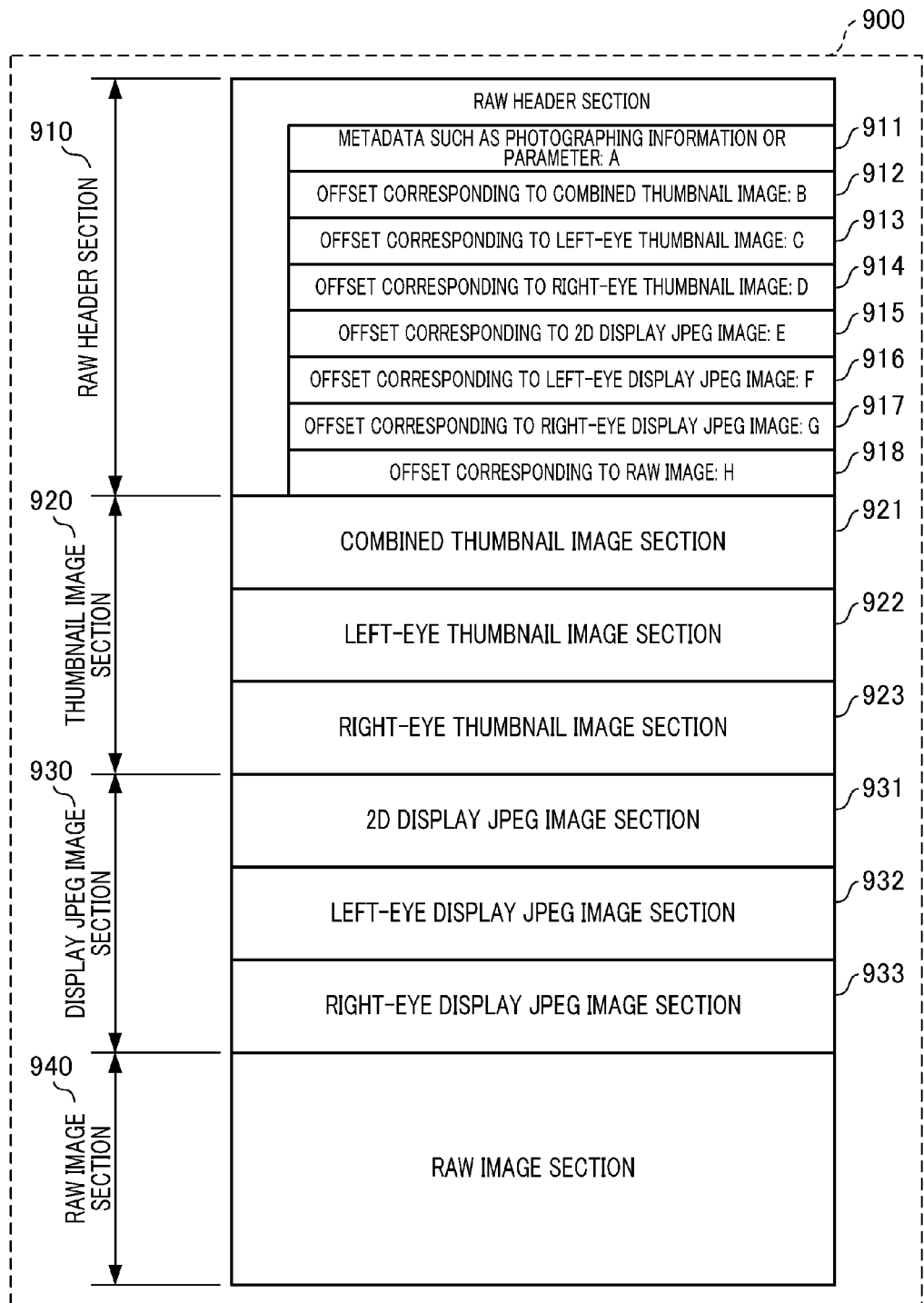
FIG. 9 is a diagram illustrating another example of a file structure according to the first embodiment of the present invention.

In the case of the file structure shown in FIG. 9 as another example, RAW image data obtained from all of the PDs, which is not divided into right-eye image data and left-eye image data, is recorded in the RAW image section 940. In other words, the RAW image data recorded in the RAW image section 940 is selected and then processed into image data for 3D display. For example, an external device such as a personal computer or the like acquires RAW image data from the RAW image section 940, separates the acquired RAW image data into right-eye image data and left-eye image data, and performs development processing for the separated image data to thereby generate image data for 3D display. In this case, the offset values B to H are obtained and the offset value H is offset data corresponding to the head position of the RAW image section 940.

Next, a description will be given of RAW file generation processing according to the present embodiment. The RAW file generation processing is performed in the same manner as the DCF file generation processing described in the first embodiment and the variant example of the first embodiment. In other words, in accordance with the processing described in FIG. 6 and FIG. 7, image data stored in the image sections 921, 922, and 923, the image sections 931, 932, and 933, the image sections 941 and 942, or the image section 940 are arranged on the memory unit 508. Then, the metadata A such as photographing information, parameters, and the like (see reference numeral 911) is created, and the offset values B to I of the image sections (see reference numerals 912 to 919) are calculated and set, whereby the RAW header section 910 is created. Then, processing for coupling the RAW header section 910 and image data as one image file having the file structure shown in FIG. 8 or FIG. 9 is executed, and file generation processing is ended. As described above, in the present embodiment, a file including image data reflecting the correct shape of an object as image data for 2D display and RAW image data prior to image processing can be generated.

(Second Embodiment)

Figure 10:
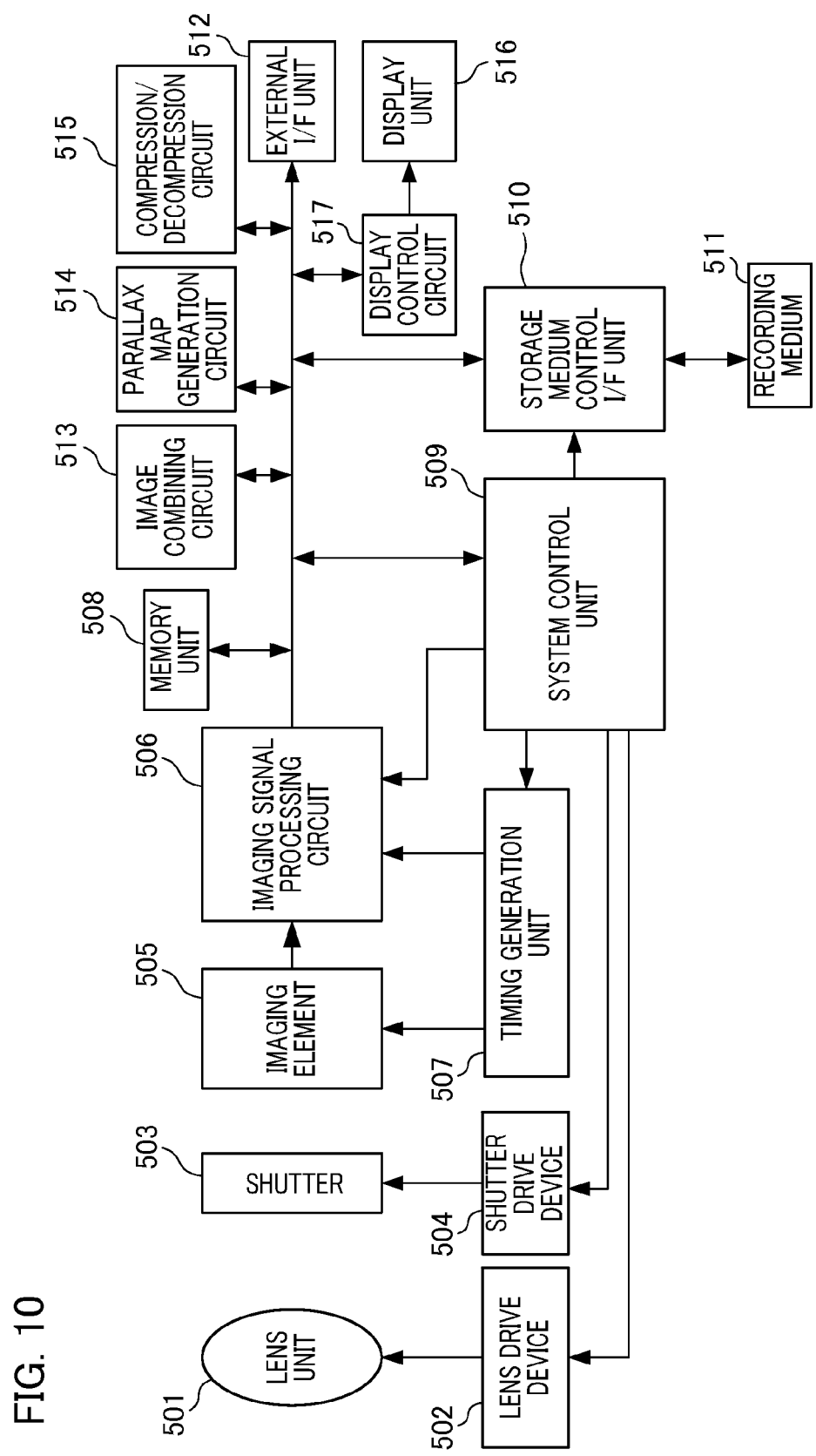
FIG. 10 is a diagram illustrating an exemplary configuration of an imaging apparatus according to a second embodiment of the present invention.

Hereinafter, a description will be given of a second embodiment of the present invention. FIG. 10 is a diagram illustrating an exemplary configuration of an imaging apparatus according to the second embodiment of the present invention. The imaging apparatus of the second embodiment is the same as the imaging apparatus of the first embodiment except that the imaging apparatus of the second embodiment includes a parallax map generation circuit 514. The functions of other processing units are the same as those described in the first embodiment, and thus, the following description will be given by focusing on the parallax map generation circuit 514. In the second embodiment, the imaging apparatus generates a parallax map and creates an image file enclosing the map. The parallax map generation circuit 514 calculates the positional shift amount between the left-eye image and the right-eye image on the basis of the position of the object image in the combined image as a parallax amount. Then, information regarding the calculated parallax amount is recorded as a parallax map in the memory unit 508.

Next, a description will be given of the operation of a digital camera during photographing. As described in the first embodiment, when a user operates a release button (not shown), the system control unit 509 calculates the distance between the imaging apparatus and the object to thereby determine whether or not the focus state is in-focus. When the focus state is in-focus, the imaging element 505 outputs image signals and the imaging signal processing circuit 506 performs image processing by allocating the output image signals to left-eye image data and right-eye image data. Left eye image data and right-eye image data are separately held in the memory unit 508. The image combining unit 513 reads out the left-eye image data and the right-eye image data held in the memory unit 508 to thereby generate combined image data. The generated combined image data is stored in the memory unit 508. Image processing executed by the image combining unit 513 is processing for calculating an arithmetic average value for each pixel of a left-eye image and a right-eye image. Thus, the combined image generated by image processing has a shape reflecting the shape of an object. In other words, even when an object is photographed with the imaging element 505 in a state where the shape of the object is different between a left-eye image and a right-eye image, the shape of the object image is interpolated by image processing performed by the image combining unit 513, resulting in the generation of image data in a correct shape. For example, if an object has a circular shape and both a left-eye image and a right-eye image do not have a circular shape, the combined image has the same circular shape as that of the object.

The parallax map generation circuit 514 generates a parallax map and stores the parallax map data in the memory unit 508. The parallax map generation circuit 514 generates a parallax map by utilizing the positional shift amount between the left-eye image and the right-eye image on the basis of the position of the combined image as a parallax amount.

FIGS. 11A to 11C are diagrams illustrating an example of parallax map generation processing. Reference numeral 601 shown in FIG. 11A denotes the composition of the image obtained by photographing objects. Reference numerals 602, 603, and 604 denote objects. In the composition shown in FIG. 11A, the objects 602, 603, and 604 are arrayed in order from the top to the bottom. Also, as shown in FIG. 11C, the objects are arranged in a line in the depth direction. Reference numeral 604 denotes the closest object and reference numeral 602 denotes the furthest object.

FIG. 11B shows a stereo image obtained by photographing the composition shown in FIG. 11A. An image 605 is a left-eye image and an image 606 is a right-eye image. In the left-eye image 605, the objects 602, 603, and 604 are denoted as 607L, 608L, and 609L, respectively. In the right-eye image 606, the objects 602, 603, and 604 are denoted as 607R, 608R, and 609R, respectively.

There is a positional shift between an object image in the left-eye image 605 and the object image in the right-eye image 606. In the present embodiment, the amount of positional shift between two images is defined as a parallax amount. Reference numeral 610 denotes the amount of shift in position of the object 602 in the right-eye image 606 relative to the object 602 in the left-eye image 605 as a reference, i.e., a parallax amount between 607L and 607R. Likewise, reference numeral 611 denotes the amount of shift in position of the object 604 in the right-eye image 606 relative to the object 604 in the left-eye image 605 as a reference, i.e., a parallax amount between 609L and 609R. The position of the object 603 in the left-eye image 605 is the same as that in the right-eye image 606. In other words, there is no parallax amount for the object 603.

Firstly, the parallax map generation circuit 514 detects objects included in the left-eye image 605 and the right-eye image 606 using a known pattern matching method. The parallax map generation circuit 514 executes the following processing for each detected object.

The parallax map generation circuit 514 calculates the positional shift amount between the midpoint which is located between the centroid of an object image in the left-eye image 605 and that of the object image in the right-eye image 606 and the centroid of the object image in the left-eye image 605 as a parallax amount. In other words, the parallax map generation circuit 514 calculates the positional shift amount of the centroid of an object image in the left-eye image relative to the position of the centroid of the object image in the combined image generated on the basis of the left-eye image 605 and the right-eye image 606 as a parallax amount. The calculated parallax amount is a parallax amount corresponding to the left-eye image. Of course, the parallax map generation circuit 514 may also calculate the positional shift amount of the centroid of an object image in the right-eye image relative to the position of the centroid of the object image in the combined image as a parallax amount corresponding to the right-eye image.

Figure 12:
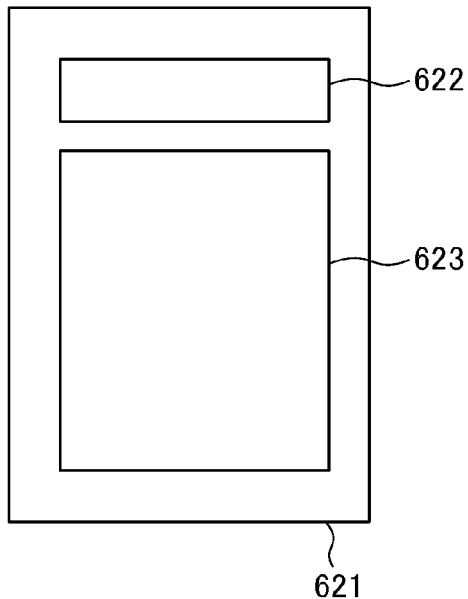
FIG. 12 is a diagram schematically illustrating a parallax map.

In the example shown in FIG. 11B, for the object 602, the parallax map generation circuit 514 calculates a parallax amount 612, which is a half of a parallax amount 610. For the object 604, the parallax map generation circuit 514 calculates a parallax amount 613, which is a half of a parallax amount 611. The parallax map generation circuit 514 stores information regarding the calculated parallax amounts 612 and 613 and information about the position of an image serving as a reference for the parallax amount as a parallax map in the memory unit 508. In this example, information about the position of an image serving as a reference for the parallax amount indicates the centroid of an object image in a combined image. As described above, in the example shown in FIG. 11B, there is no parallax amount for the object 603. FIG. 12 is a diagram schematically illustrating a parallax map. A parallax map 621 includes a parallax amount 622 and information 623 about the position (the centroid) of an image serving as a reference for the parallax amount.

Next, a description will be given of image reproduction processing using a parallax map. The system control unit 509 reads out combined image data and parallax map data from the memory unit 508. The system control unit 509 confirms that the position of an image serving as a reference for the parallax amount indicated by the parallax map is the centroid of an object image in the combined image. Then, the system control unit 509 generates a left-eye image to be reproduced, that is, data for the reproduction of an image corresponding to the parallax amount, by shifting the object image included in the combined image by the parallax amount indicated by the parallax map.

Also, the system control unit 509 inverts the sign of the parallax amount indicated by the parallax map. The system control unit 509 sets the parallax amount obtained by the inverted sign of the parallax amount indicated by the parallax map as the positional shift amount of the centroid of an object image in the right-eye image relative to the centroid of the object image in the combined image. Then, the system control unit 509 shifts the object image included in the combined image to the extent of the inverted sign of the parallax amount indicated by the parallax map data. In this manner, the system control unit 509 generates a right-eye image to be reproduced, that is, data for reproduction of an image other than the image corresponding to the parallax amount indicated by the parallax map data.

By shifting an object image in the combined image, a pixel at a position at which the object image is arranged is a missing pixel. Thus, for example, the system control unit 509 imparts color space information to the missing pixel using a known technology disclosed in Japanese Patent No. 3524147. In other words, the system control unit 509 calculates an average of pixel values of pixels in the vicinity of the missing pixel as color space information, and imparts the calculated color space information to the missing pixel.

As described above, the imaging apparatus of the present embodiment combines a left-eye image with a right-eye image to thereby generate a combined image reflecting the shape of an object. Then, the imaging apparatus generates information regarding the parallax amount on the basis of the position of the generated combined image as a parallax map. Left-eye image data and right-eye image data, the combined image data generated by the image combining circuit 513, and the parallax map data generated by the parallax map generation circuit 514 are stored in the memory unit 508.

Then, the imaging apparatus generates left-eye image data and right-eye image data to be reproduced based on the combined image and the parallax amount indicated by the parallax map. Thus, even if the shape of the left-eye image/right-eye image obtained by the photoelectrical conversion of a light flux having passed through a different region of an exit pupil of a photographing optical system is different from the shape of an object, an image correctly reflecting the shape of the object can be reproduced upon reproduction of the image.

Figure 13:
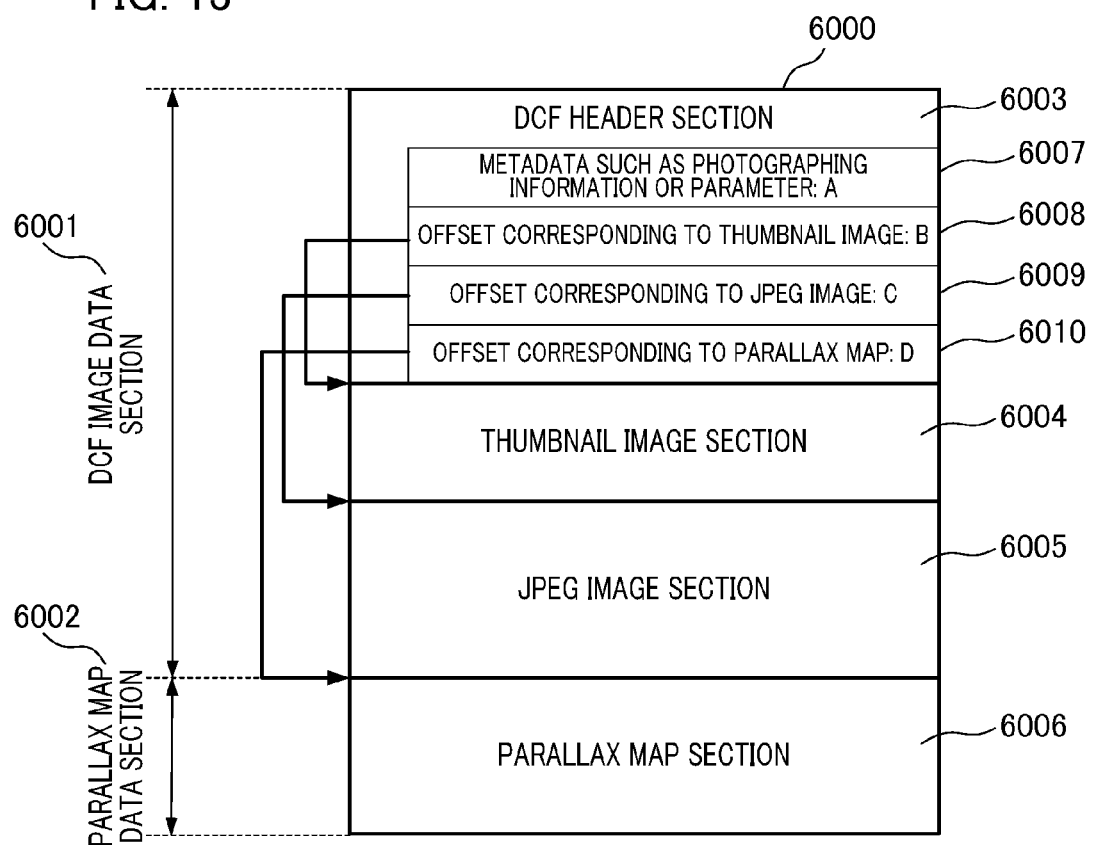
FIG. 13 is a diagram illustrating an example of a typical DCF image file structure.

FIG. 13 is a diagram illustrating an example of a typical DCF image file structure. A DCF image file 6000 includes a DCF header section 6003, a thumbnail image section 6004, a JPEG image section 6005 and a parallax map section 6006.

A DCF image data section 6001 includes the DCF header section 6003, the thumbnail image section 6004, and the JPEG image section 6005. The DCF header section 6003 is a region, in which a predetermined data size is given in advance, for storing DCF header information. The DCF header information includes the following supplementary information and offset information for specifying a region for storing each image data (The number in parentheses denotes a reference numeral).

Metadata A (6007): photographing information, parameters, and the like regarding image data stored in the JPEG image section 6005.

Offset value B (6008): offset data corresponding to the head position of the thumbnail image section 6004.

Offset value C (6009): offset data corresponding to the head position of the JPEG image section 6005.

Offset value D (6010): offset data corresponding to the head position of a parallax map section 6006.

Each of the offset values B, C, and D is relative position information between the reference position of the DCF header section 6003 and the calculated position of each image section, and the starting position of each image data stored in an image file is specified using each of these values.

The thumbnail image section 6004 is a region for storing thumbnail image data which is resized by thinning JPEG image data or the like stored in the JPEG image section 6005. Thumbnail image data is used, for example, when a plurality of reduced images is displayed on the screen of the display unit 516 (when index display is performed).

The JPEG image section 6005 is a region for storing JPEG image data which is obtained by compressing RAW image data processed by the imaging signal processing circuit 506. The term "RAW image" means an image obtained from data for each of the pixels of the imaging element, i.e., an image prior to image processing such as development processing or the like. The JPEG image data is data which can be handled by many applications. In the present embodiment, data for the combined JPEG image of a right-eye image and a left-eye image is stored in the JPEG image section 6005. Data for the JPEG image section 6005 can be reproduced as an image for 2D display reflecting the correct shape of an object by additively combining both images. Note that the addition combination is also intended to include arithmetic average processing. Furthermore, a left-eye image and a right-eye image can be restored using a parallax map, and thus, image data which can also be reproduced as image data for 3D display is obtained. The parallax map section 6006 is a region for storing the parallax amount of image data in the JPEG image section 6005. The parallax amount is calculated by the aforementioned method.

Figure 14:
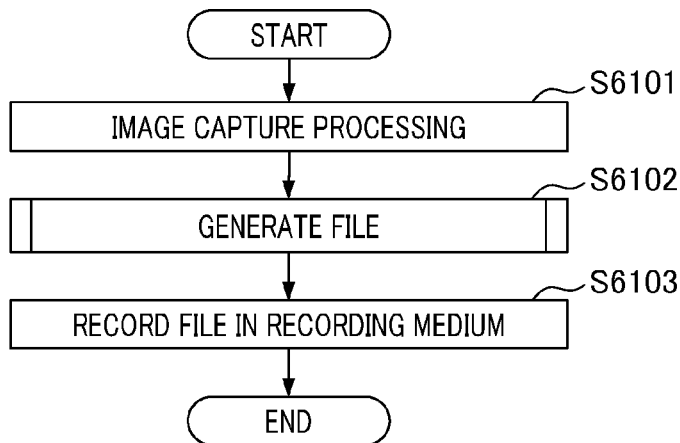
FIG. 14 is a flowchart illustrating processing from the start of photographing to the recording of an image file.

Next, a description will be given of an image file recording operation of the present embodiment with reference to FIG. 14. FIG. 14 is a flowchart illustrating a series of processing sequences from the start of photographing to the recording of an image file in the recording medium 511. Hereinafter, a description will be given of processing when a photographer makes settings for 3D photographing prior to photographing and processing when a photographer does not make such settings.

In step S6101, as described with reference to FIG. 11, a series of image capture processing from AF (Auto Focus) processing through AE (Automatic Exposure) processing to exposure processing is performed in response to the user operation of a release button (not shown). Next, in step S6102, processing for creating an image file including a parallax map or an image file not including a parallax map is performed, and the created image file is temporarily saved in the memory unit 508. A detailed description of DCF file creation processing in the second embodiment will be described below with reference to FIG. 15 and FIG. 16. In step S6103, record processing is performed by writing data of the image file, which has been generated in step S6102 and temporarily saved in the memory unit 508, to the recording medium 511.

Next, a description will be given of image file creation processing in step S6102 shown in FIG. 14 with reference to FIG. 15. Firstly, in step S6201, the imaging signal processing circuit 506 acquires RAW data output from the imaging element 505. The image combining circuit 513 generates combined image data using the acquired RAW data (step S6202). The generated combined image data is stored in the memory unit 508. In step S6203, it is determined whether or not a parallax map needs to be created. For example, when 3D photographing is performed in accordance with a user operation, a parallax map is required, whereas when 2D photographing is performed, a parallax map is not required. Here, a description will be given of parallax map generation processing.

Figure 16:
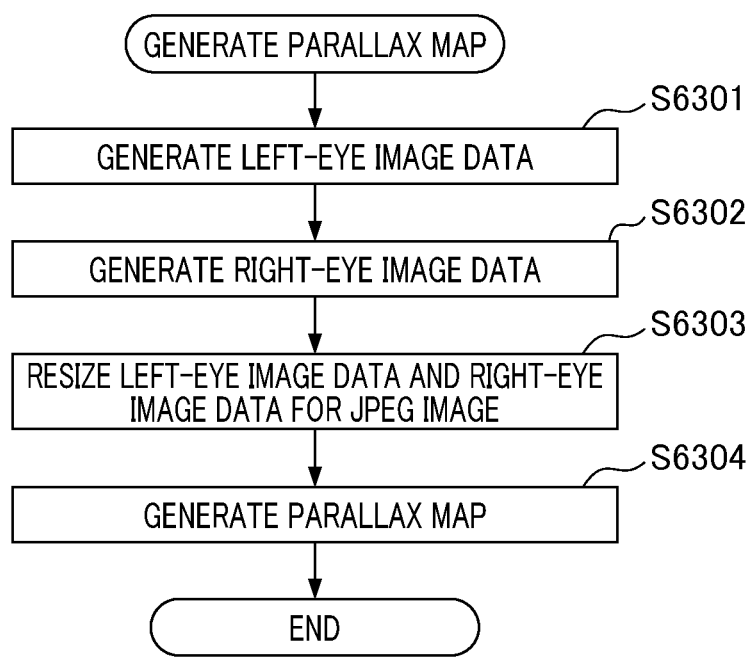
FIG. 16 is a flowchart illustrating parallax map generation processing.

A description will be given of parallax map generation processing in step S6204 with reference to FIG. 16. Firstly, in step S6201, the image combining circuit 513 generates left-eye image data from the acquired RAW data (step S6301), and further generates right-eye image data (step S6302). Note that the order of generating left-eye image data and right-eye image data may be the opposite order of that described above. Resize processing for the generated two image data is performed in accordance with the size of a JPEG image (step S6303). Next, the parallax map generation circuit 514 generates parallax map data from left-eye image data and right-eye image data subjected to resize processing (step S6304). The generated parallax map data is stored in the memory unit 508. Note that parallax map data may also be generated from left-eye image data and right-eye image data not subjected to resize processing, and then, resize processing may be performed for the image data.

Figure 15:
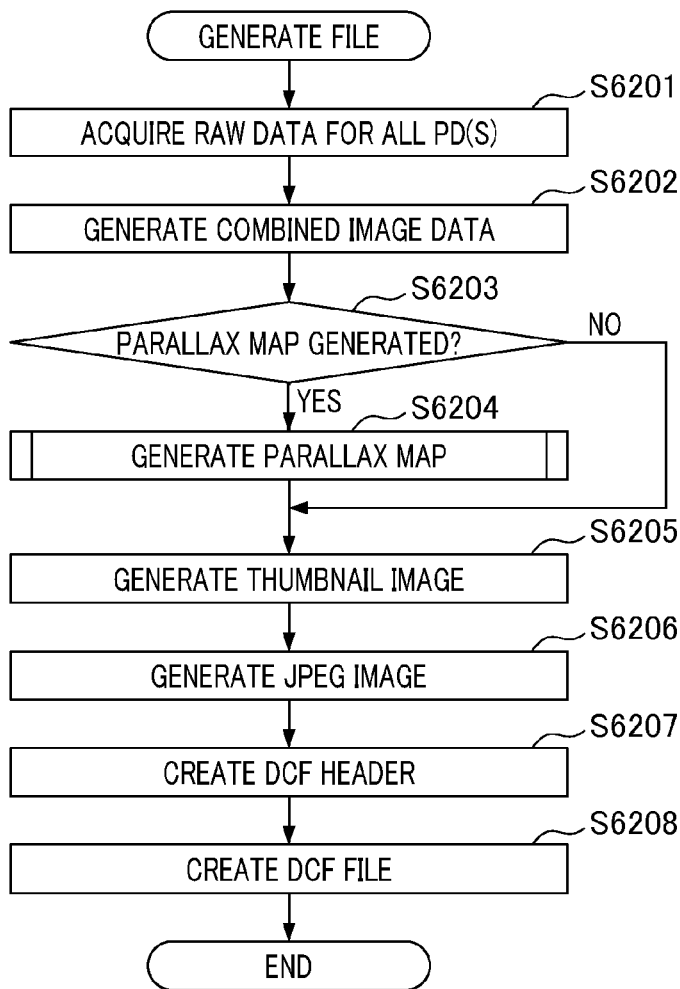
FIG. 15 is a flowchart illustrating image file creation processing.

Thumbnail image data is generated in step S6205 shown in FIG. 15, and JPEG image data is generated in step S6206 shown in FIG. 15. Processing for reading out combined image data stored in the memory unit 508 is executed, and the compression/decompression circuit 515 performs image compression processing depending on the set mode. JPEG image data and thumbnail image data subjected to a series of processing from the start of photographing are stored in the free region of the memory unit 508.

Finally, a DCF header is created (step S6207), and processing for creating an image file 6000 is executed using thumbnail image data, JPEG image data, and parallax map data which are stored in the memory unit 508. At this time, metadata is created from photographing information such as a shutter speed, an exposure time, and the like, and these values are set as the metadata A (see reference numeral 6007 shown in FIG. 13), such as photographing information, parameters, and the like, in the DCF header section 6003.

Also, the offset value B (see reference numeral 6008) corresponding to the thumbnail image section 6004, the offset value C (see reference numeral 6009) corresponding to the JPEG image section 6005, and the offset value D (see reference numeral 6010) corresponding to the parallax map section 6006 are set based on the size of data. In this manner, header information of the DCF header section 6003 is generated. Thus, information (see an offset 6010) indicating the presence/absence of the parallax map and the location thereof is stored in the DCF header section 6003. For example, if the offset value D for the offset 6010 is a predetermined value (e.g., "0"), it means that the parallax map is not stored in the image file 6000. If a predetermined value indicating that the parallax map is not included in the image file 6000 is set or the offset 6010 itself is not present in the DCF header section 6003, it can be determined that the parallax map is not present. On the other hand, if a predetermined offset value is given to the offset value D, the parallax map is stored in the image file 6000, and thus, the storage location can be specified by the offset value D.

Next, a description will be given of image file creation processing in step S6203 shown in FIG. 15, when the parallax map is not generated, with reference to FIG. 15. Combined image data is stored in the memory unit 508 through the processing in steps S6201 and S6202. After determination in step S6203, thumbnail image data is generated using combined image data (step S6205), and JPEG image data is generated using the same (step S6206). Unwanted usage of the memory unit 508 can be prevented by omitting parallax map generation processing.

In step S6207, metadata is created from photographing information such as a shutter speed, an exposure time, and the like, and these values are set as the metadata A (see reference numeral 6007 shown in FIG. 7), such as photographing information, parameters, and the like, in the DCF header section 6003. Furthermore, the offset value B (see reference numeral 6008) corresponding to the thumbnail image section 6004, the offset value C (see reference numeral 6009) corresponding to the JPEG image section 6005, and the offset value D (see reference numeral 6010) corresponding to the parallax map section 6006 are set based on the size of each data. Here, the offset value D to be stored in an offset 6101 is set to a predetermined value (e.g., "0") indicating that the parallax map is not included in the image file 6000. Alternatively, if the parallax map is not included in the image file 6000, the offset 6010 itself may not be generated.

Next, in step S6208, the image file 6000 not including the parallax map is created on the basis of data of the regions including the DCF header section 6003, the thumbnail image section 6004, and the JPEG image section 6005 which are generated in the previous steps. In the present embodiment, a description has been given of record processing for writing an image file to the recording medium 511, but the present invention is not limited thereto. The same processing as that described above is performed when image data or management information associated with image data is transferred between peripheral devices such as a computer device, a printer, or the like.

According to the second embodiment, the combined JPEG image data of a left-eye image and a right-eye image is stored in the JPEG image section of an image file, the parallax map regarding the data is enclosed in the image file. Thus, 3D display image can be reproduced using the parallax map. In the application which is incapable of using a parallax map, 2D display image can be reproduced using JPEG image data subjected to addition combination processing, and thus, the versatility is ensured. In other words, in the present embodiment, an image file which can be reproduced in both 2D display and 3D display can be created while maintaining a file format which is reproducible in a generally-used application.

(Variant Example of Second Embodiment)

Next, a description will be given of a variant example of the second embodiment of the present invention. Hereinafter, a description will be given of the structure of an image file and image file generation processing, when a thumbnail image parallax map is generated, with reference to FIG. 17.

Figure 17:
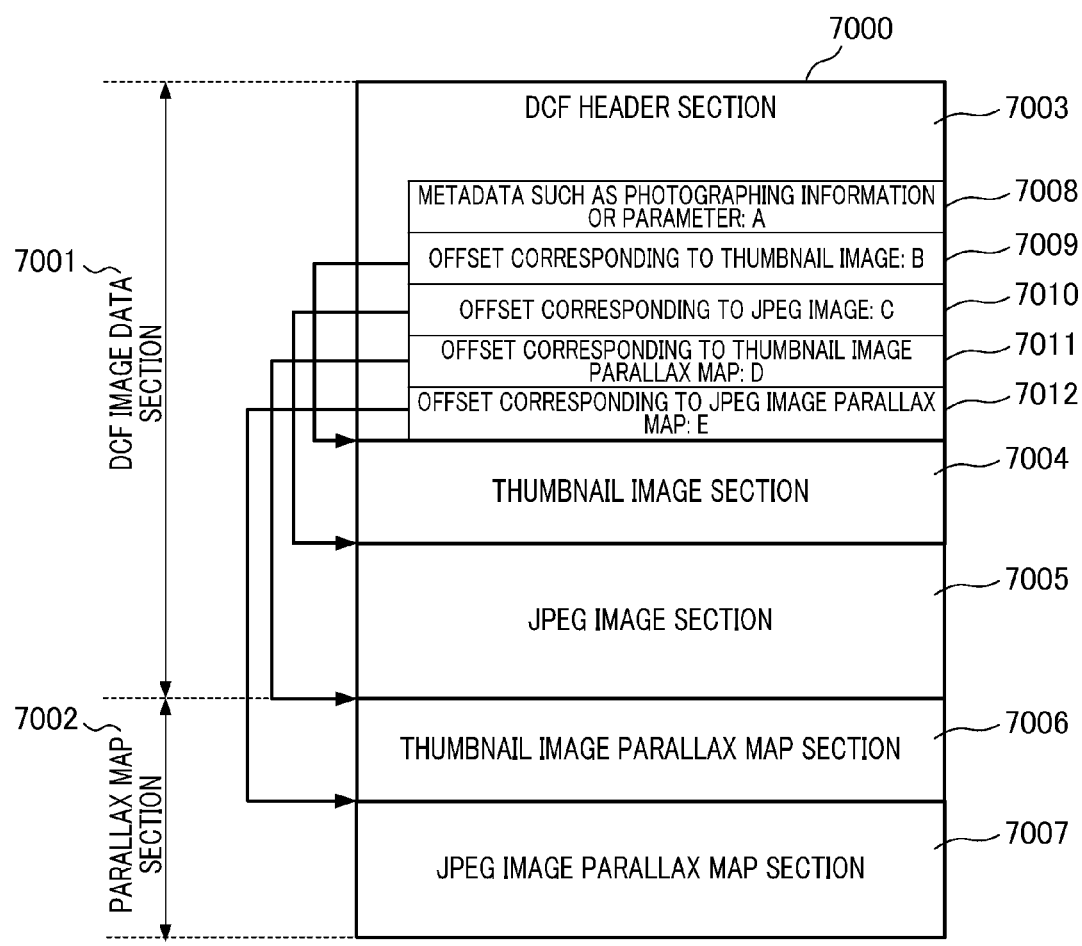
FIG. 17 is a diagram illustrating another image file structure.

FIG. 17 is a diagram illustrating an exemplary structure of a DCF file including a thumbnail image parallax map. A DCF image data section 7001 includes a DCF header section 7003, a thumbnail image section 7004, and a JPEG image section 7005. The DCF header section 7003 is a region, in which a predetermined data size is given in advance, for storing DCF header information. The DCF header information includes the metadata A (see reference numeral 7008) regarding photographing information, parameters, and the like, the offset value B (see reference numeral 7009) corresponding to the head position of the thumbnail image section 7004, and the offset value C (see reference numeral 7010) corresponding to the head position of the JPEG image section 7005. The offset value D (see reference numeral 7011) indicates offset data corresponding to the head position of a thumbnail image parallax map section 7006. The offset value E (see reference numeral 7012) indicates offset data corresponding to the head position of a JPEG image parallax map section 7007. The starting position of each image data stored in an image file is specified using each of these offset values B, C, D, and E. Note that the arrangement order of offset values is merely an example, and may also be changed.

A parallax map section 7002 includes the thumbnail image parallax map section 7006 and the JPEG image parallax map section 7007. The thumbnail image parallax map section 7006 stores the parallax map data generated in accordance with the size of a thumbnail image, and the parallax map data is used for image reproduction processing for the thumbnail image in 3D display. The thumbnail image parallax map section 7006 is arranged in front of the JPEG image parallax map section 7007 (the DCF header section 7003 side), but the arrangement order of the parallax maps in the parallax map section 7002 may be the opposite of that shown in FIG. 11. Note that the thumbnail image section 7004, the JPEG image section 7005, and the JPEG image parallax map section 7007 are the same as those of the first embodiment, and thus, a detailed description thereof will be omitted.

As shown in FIG. 17, the thumbnail image parallax map and the JPEG image parallax map are arranged at the rear of the image file, resulting in an improvement in the convenience of editing such as image reproduction, parallax map deletion, or the like when the parallax map(s) is not used.

Figure 18:
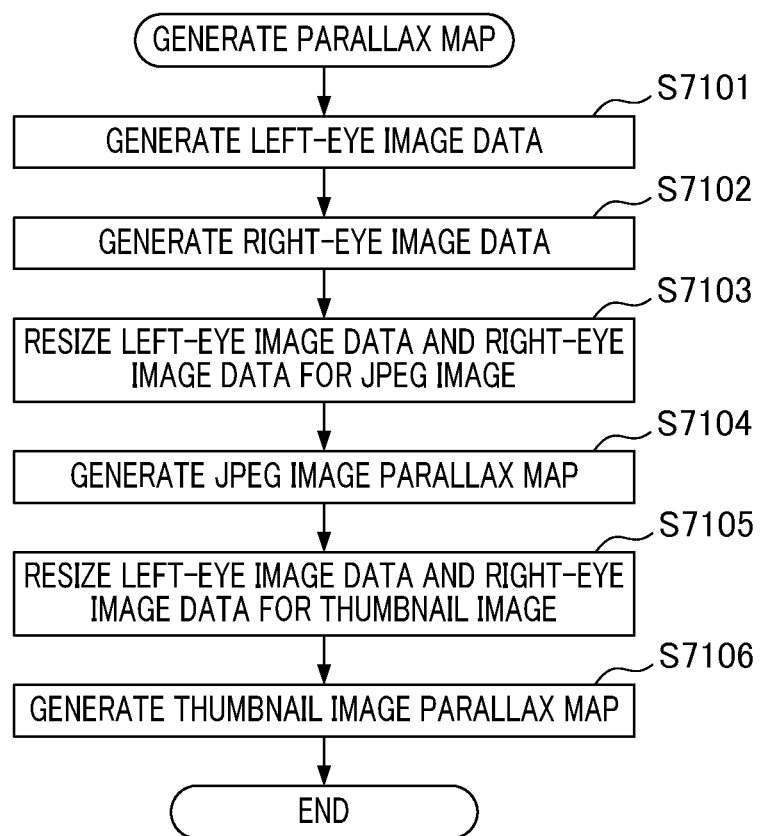
FIG. 18 is a flowchart illustrating parallax map generation processing.

Next, a description will be given of parallax map generation processing according to the variant example of the second embodiment with reference to FIG. 15 and FIG. 18. Firstly, in steps S6201 and S6202 shown in FIG. 15, combined image data is stored in the memory unit 508. The image combining circuit 513 generates left-eye image data (step S7101 shown in FIG. 18), and generates right-eye image data (step S7102). Resize processing for the generated two image data is executed in accordance with the size of the set JPEG image (step S7103). The parallax map generation circuit 514 generates a JPEG image parallax map using right-eye image data and left-eye image data subjected to resize processing for a JPEG image (step S7104).

Next, processing for resizing the left-eye image data and the right-eye image data generated in steps S7101 and S7102 to the thumbnail image size is executed so as to generate a thumbnail image parallax map (step S7105). The parallax map generation circuit 514 generates thumbnail image parallax map data using right-eye image data and left-eye image data subjected to resize processing for a thumbnail image (step S7106). Then, the DCF header section 7003 is created in the same manner as that described in the first embodiment. At this time, the image file 7000 can have a thumbnail image parallax map and a JPEG image parallax map separately by providing the offset value D of the thumbnail image parallax map section 7006 and the offset value E of the JPEG image parallax map section 7007.

As described above, in the variant example of the second embodiment, a thumbnail image parallax map is generated, and then, an image file enclosing the map data is created. Thus, 3D display image reproduction processing for a thumbnail image can be performed.

(Another Variant Example of Second Embodiment)

Figure 19:
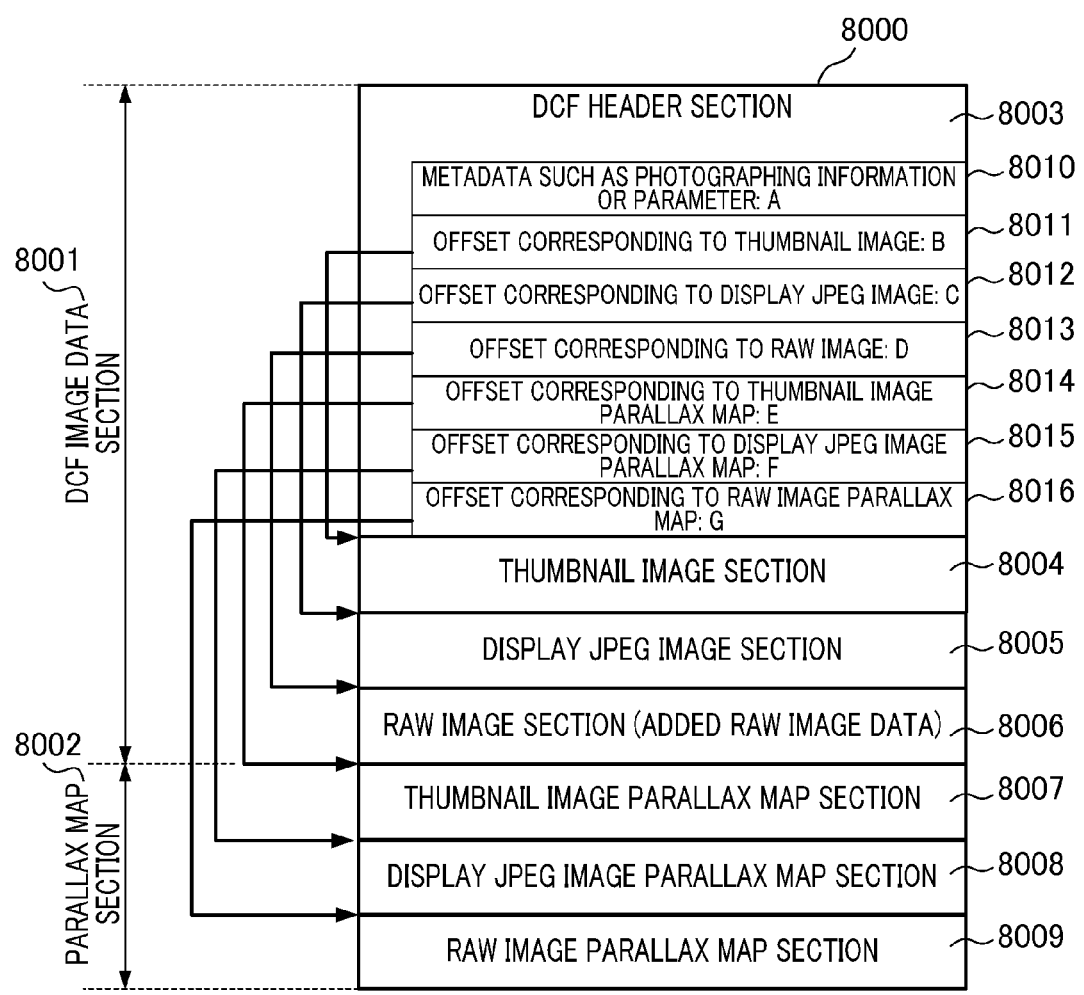
FIG. 19 is a diagram illustrating the file structure of an image file including RAW image data.

Next, a description will be given of another variant example of the second embodiment. FIG. 19 is a diagram illustrating an exemplary file structure when an image file including RAW image data is created.

A DCF image data section 8001 includes a DCF header section 8003, a thumbnail image section 8004, a display JPEG image section 8005, and a RAW image section 8006. The DCF header section 8003 is a region, in which a predetermined data size is given in advance, for storing DCF header information. The DCF header information includes metadata A (see 8010) such as photographing information, parameters, and the like regarding image data stored in the RAW image section 8006 and the following offset values (The number in parentheses denotes a reference numeral).

Offset value B (see 8011): offset data corresponding to the head position of the thumbnail image section 8004.

Offset value C (see 8012): offset data corresponding to the head position of the display JPEG image section 8005.

Offset value D (see 8013): offset data corresponding to the head position of the RAW image section 8006.

Offset value E (see 8014): offset data corresponding to the head position of a thumbnail image parallax map section 8007.

Offset value F (see 8015): offset data corresponding to the head position of a display JPEG image parallax map section 8008.

Offset value G (see 8016): offset data corresponding to the head position of a RAW image parallax map section 8009.

The starting position of each image data stored in an image file is specified using the offset values B, C, D, E, F, and G.

The RAW image section 8006 is a region for storing RAW image data. The RAW image data is data which has been read out from the imaging element and is large-sized image data prior to image processing such as development processing, compression processing, or the like. In the present embodiment, a description will be given below by taking an example of handling two types of RAW image data:

RAW image data (hereinafter referred to as "addition RAW image data") obtained by arithmetic averaging data obtained by a plurality of PDs for each pixel, and RAW image data (hereinafter referred to as "non-addition RAW image data") obtained by directly using data obtained by PDs in a pixel without performing selection processing and composition processing.

Addition RAW image data is data which is obtained by arithmetic averaging data detected by the PDs in one pixel. Although addition RAW image data is data subjected to calculation processing, addition RAW image data is still RAW image data in the sense of being not suitable for being displayed. In the present embodiment, a description will be given of addition RAW image data as data subjected to arithmetic average processing. However, data subjected to only addition processing may be treated as addition RAW image data and division processing and adjustment of the dynamic range may be performed for the resulting data during post processing.

A parallax map section 8002 shown in FIG. 19 includes the thumbnail image parallax map section 8007, the display JPEG image parallax map section 8008, and the RAW image parallax map section 8009. The thumbnail image parallax map section 8007 and the display JPEG image parallax map section 8008 are the same as those described in the variant example, and thus, a detailed description thereof will be omitted.

The RAW image parallax map section 8009 is a region for storing the parallax amount of RAW image data in the RAW image section 8006. In the case of non-addition RAW image data, information read out from the PDs of the imaging element 505 is directly used, and thus, a parallax map can be restored in later processing. Thus, in the present embodiment, a description will be given on the assumption that an image file not enclosing the RAW image parallax map section 8009 is created when RAW image data stored in the RAW image section 8006 is non-addition RAW image data. The thumbnail image section 8004, the display JPEG image section 8005, and the like are the same as those described in the variant example, and thus, a detailed description thereof will be omitted.

Figure 20:
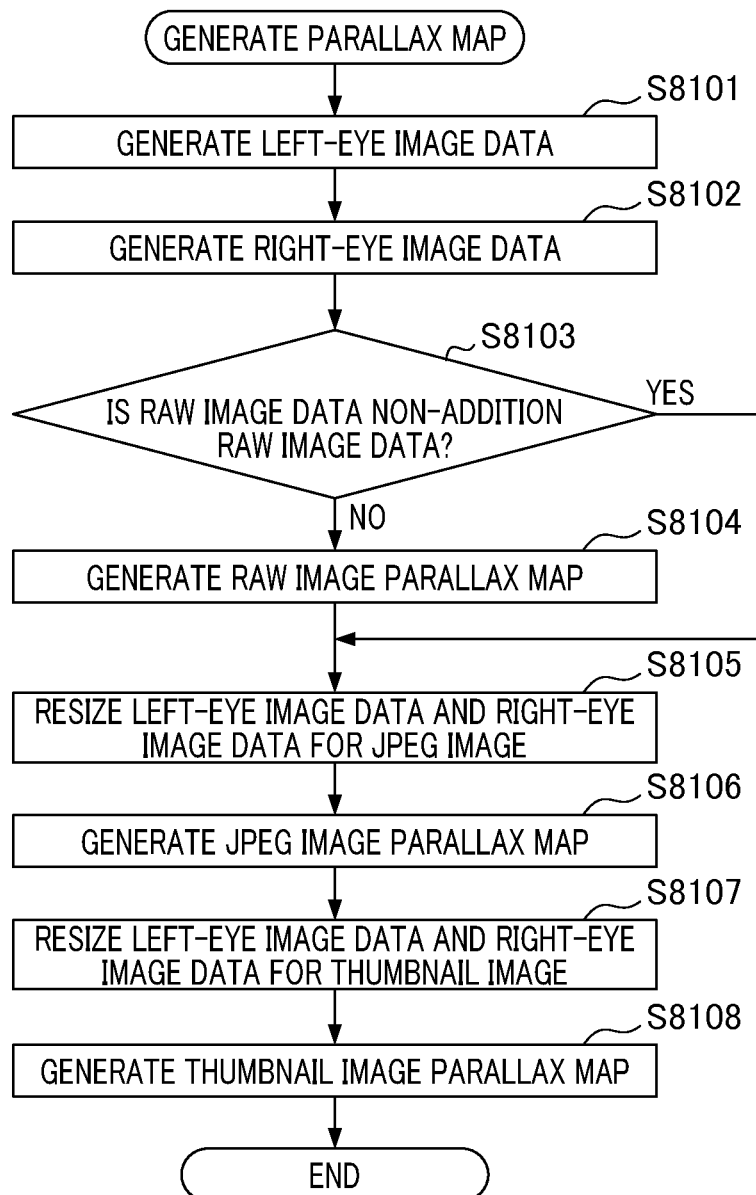
FIG. 20 is a flowchart illustrating parallax map generation processing

Next, a description will be given of parallax map generation processing according to another variant example of the second embodiment with reference to FIG. 15 and FIG. 20. Firstly, in steps S6201 and S6202 shown in FIG. 15, combined image data is stored in the memory unit 508. The image combining circuit 513 generates left-eye image data (step S8101), and generates right-eye image data (step S8102). Next, the system control unit 509 determines whether RAW image data is either non-addition RAW image data or addition RAW image data to thereby determine whether or not a RAW image parallax map needs to be created (step S8103). Whether RAW image data is either non-addition RAW image data or addition RAW image data may be determined by a mode or the like set by a user or may also be automatically determined by media capacity, image size, or the like. In the case of addition RAW image data, the process advances to step S8104. The parallax map generation circuit 514 generates RAW image parallax map data using left-eye image data and right-eye image data generated in steps S8101 and S8102, respectively (step S8104). Next, the left-eye image data and the right-eye image data generated in steps S8101 and S8102, respectively, are subjected to resize processing for a JPEG image (step S8105), and display JPEG image parallax map data is created (step S8106). Furthermore, the left-eye image data and the right-eye image data generated in steps S8101 and S8102, respectively, are subjected to resize processing for a thumbnail image (step S8107), and thumbnail image parallax map data is generated (step S8108).

On the other hand, if it is determined in step S8103 that RAW image data is non-addition RAW image data, RAW image parallax map data does not need to be generated, and the process advances to step S8105. Then, JPEG image resize processing, thumbnail image resize processing, and parallax map generation processing are performed. As in the DCF header section of the second embodiment, metadata is created from photographing information such as a shutter speed, an exposure time, and the like, and these values are set as the metadata A (see reference numeral 8010 shown in FIG. 19), such as photographing information, parameters, and the like, in the DCF header section 8003. Also, the offset values B to G are set based on the size of data, and header information of the DCF header section 8003 is generated. In this manner, information (see the offset G) indicating the presence/absence of a parallax map for RAW image data and the location thereof is stored in the DCF header section 8003. If the offset value G indicated by an offset 8016 is set as a predetermined value (e.g., "0"), it means that RAW image parallax map data is not stored in the image file 8000. Alternatively, if the offset 8016 itself is not present in the DCF header section 8003, it can be seen that RAW image parallax map data is not stored in the image file 8000. If a legitimate value is given to the offset value G, it is determined that RAW image parallax map data is stored in the image file 8000, and thus, the storage location can be specified by the offset value G.

As described above, in another variant example of the second embodiment, it is determined whether or not parallax map data needs to be enclosed in an image file depending on whether RAW image data is either addition RAW image data or non-addition RAW image data. If it is determined that RAW image data is non-addition RAW image data, a RAW image parallax map becomes unnecessary, and the file capacity thereof can be reduced.

(Third Embodiment)

Hereinafter, a description will be given of a third embodiment of the present invention. An exemplary configuration of an imaging apparatus of the third embodiment of the present invention is the same as that of the imaging apparatus of the second embodiment, and thus, a description thereof will be omitted. The imaging apparatus of the third embodiment reproduces an image reflecting the correct shape of an object using a parallax map.

Figure 21:
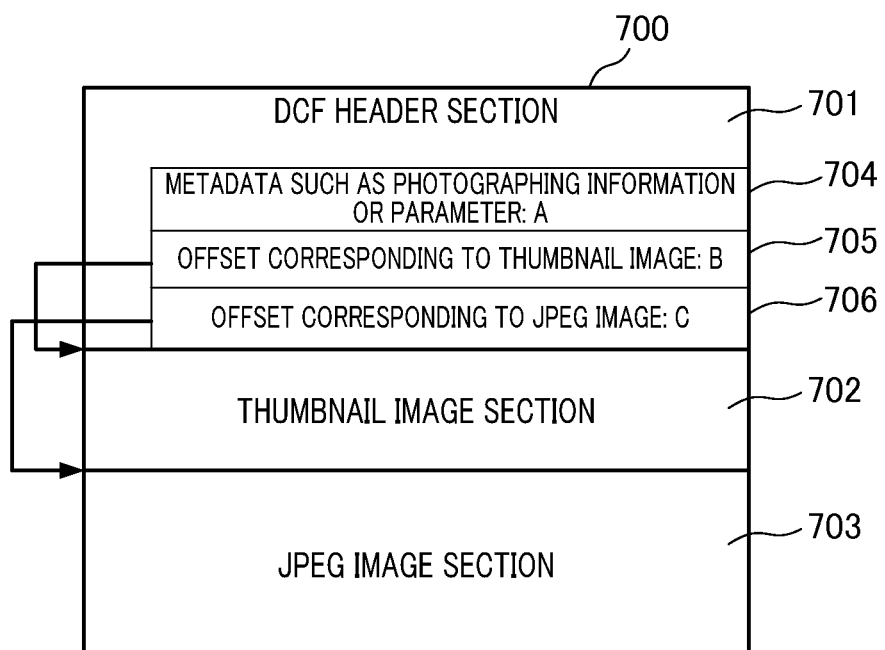
FIG. 21 is a diagram illustrating an example of a typical DCF image file structure.

FIG. 21 is a diagram illustrating an example of a typical DCF image file structure. A DCF image file 700 includes a DCF header section 701, a thumbnail image section 702, and a JPEG image section 703. The DCF header section 701 is a region, in which a predetermined data size is given in advance, for storing DCF header information. The DCF header information includes the following data (The number in parentheses denotes a reference numeral).

Metadata A (704): photographing information, parameters, and the like regarding image data stored in the JPEG image section 703.

Offset value B (705): offset data corresponding to the head position of the thumbnail image section 702.

Offset value C (706): offset data corresponding to the head position of the JPEG image section 703.

Each of the offset values B and C is relative position information between the reference position of the DCF header section 701 and the calculated position of each image section, and the starting position of each image data stored in an image file is specified using each of these offset values.

The thumbnail image section 702 is a region for storing thumbnail image data which is resized by thinning JPEG image data or the like stored in the JPEG image section 703. Thumbnail image data is used, for example, when a plurality of reduced images is displayed on the screen of the display unit 516 (when index display is performed). The JPEG image section 703 is a region for storing JPEG image data which is obtained by compressing RAW image data, which has been subjected to image processing by the imaging signal processing circuit 506, by the compression/decompression circuit 515. The image data is data which can be handled by many generally-used applications.

Figure 22:
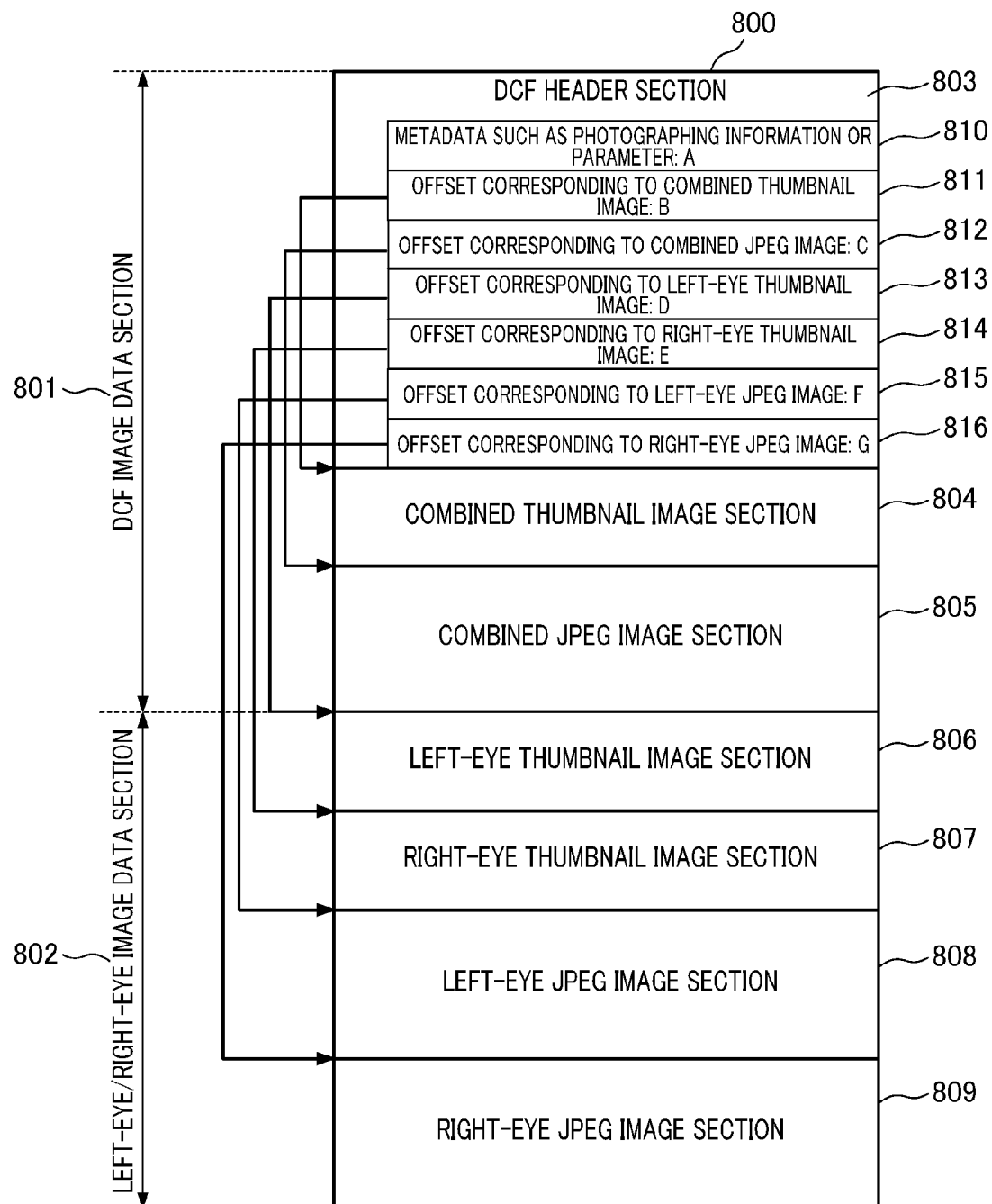
FIG. 22 is a diagram illustrating an image file having left-eye image data and right-eye image data.

FIG. 22 is a diagram illustrating an exemplary structure of an image file when a DCF image file including left-eye image data and right-eye image data is created in the present embodiment. An image file 800 includes a DCF image data section 801 and a left-eye/right-eye image data section 802.

The DCF image data section 801 is constituted by a DCF header section 803, a combined thumbnail image section 804, and a combined JPEG image section 805. The DCF header section 803 is a region, in which a predetermined data size is given in advance, for storing DCF header information. The DCF header information includes the following supplementary information and offset information for specifying a region for storing each image data (The number in parentheses denotes a reference numeral).

Metadata A (810): photographing information, parameters, and the like regarding image data stored in the combined JPEG image section 805.

Offset value B (811): offset data corresponding to the head position of the combined thumbnail image section 804.

Offset value C (812): offset data corresponding to the head position of the combined JPEG image section 805.

Offset value D (813): offset data corresponding to the head position of a left-eye thumbnail image section 806.

Offset value E (814): offset data corresponding to the head position of a right-eye thumbnail image section 807.

Offset value F (815): offset data corresponding to the head position of a left-eye JPEG image section 808.

Offset value G (816): offset data corresponding to the head position of a right-eye JPEG image section 809.

The starting position of each image data stored in an image file is specified using the offset values B, C, D, E, F, and G.

The combined thumbnail image section 804 is a region for storing combined thumbnail image data which is resized by thinning combined JPEG image data or the like stored in the combined JPEG image section 805. Combined thumbnail image data is used, for example, when index display is performed on the screen of the display unit 516. Also, the combined JPEG image section 805 is a region for storing combined JPEG image data which is obtained by compressing image data obtained from the imaging element 505, which has been processed by the imaging signal processing circuit 506, by the compression/decompression circuit 515. The image data is data which can be handled by many generally-used applications. In the present embodiment, JPEG image data, which is obtained by additively combining right-eye image data with left-eye image data by the image combining circuit 513, is stored in the combined JPEG image section 805. Image data is obtained which is capable of being reproduced as a 2D display image reflecting the correct shape of an object by additively combining the left-eye image with the right-eye image. Note that the addition combination is also intended to include arithmetic average processing.

The left-eye/right-eye image data section 802 is constituted by the left-eye thumbnail image section 806, the right-eye thumbnail image section 807, the left-eye JPEG image section 808, and the right-eye JPEG image section 809. Image data which is stored in the left-eye thumbnail image section 806 and the right-eye thumbnail image section 807 is used when index display is performed on the screen of the display unit 516 so that a thumbnail image is displayed in three-dimensional display. Also, image data which is stored in the left-eye JPEG image section 808 and the right-eye JPEG image section 809 is used when the image data is displayed on the display unit 516 in three-dimensional display. The left-eye/right-eye image data section 802 including these image sections 806 to 809 is arranged at the rear of the image file 800, resulting in an improvement in the convenience of processing performed when the left-eye JPEG image section 808 and the right-eye JPEG image section 809 are not used.

Figure 23:
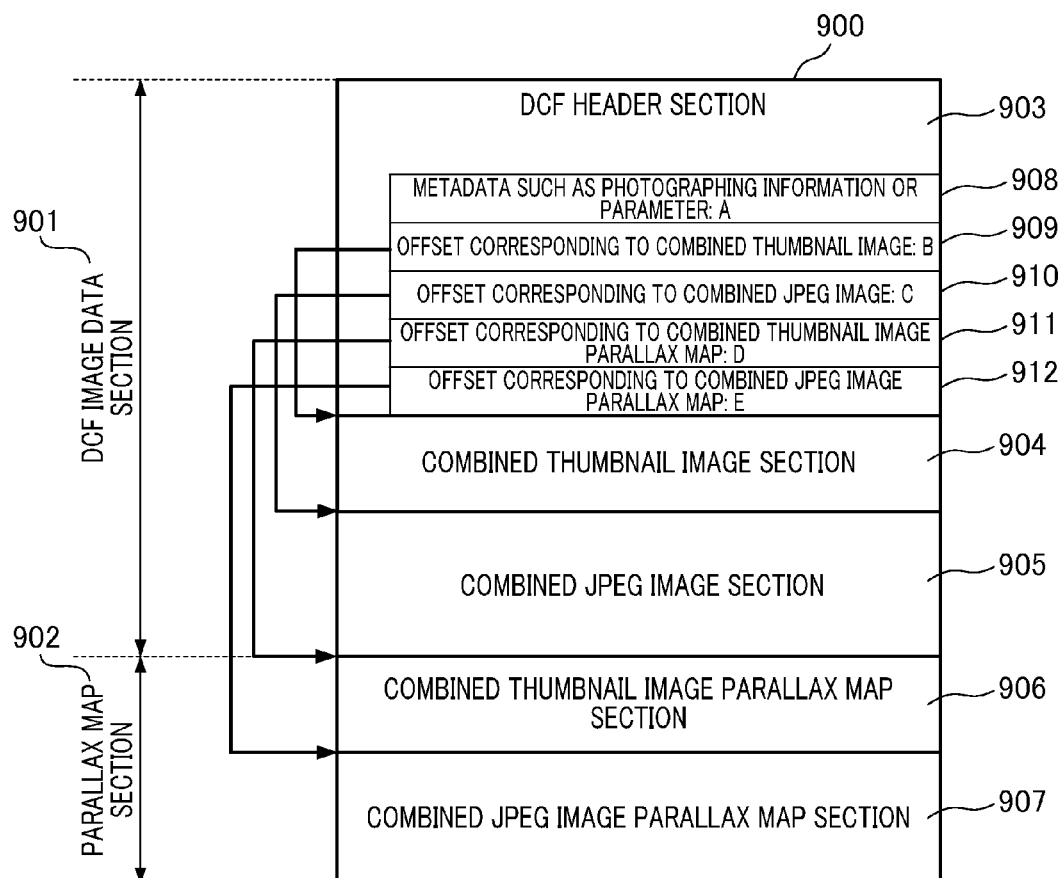
FIG. 23 is a diagram illustrating an image file having a parallax map.

FIG. 23 is a diagram illustrating an exemplary file structure of an image file, when a DCF image file including parallax map data is created, according to the present embodiment. An image file 900 includes a DCF image data section 901 and a parallax map section 902. The DCF image data section 901 is constituted by a DCF header section 903, a combined thumbnail image section 904, and a combined JPEG image section 905. The DCF header section 903 is a region, in which a predetermined data size is given in advance, for storing DCF header information. The DCF header information includes the following data (The number in parentheses denotes a reference numeral).

Metadata A (908): photographing information, parameters, and the like regarding image data stored in the combined JPEG image section 905.

Offset value B (909): offset data corresponding to the head position of the combined thumbnail image section 904.

Offset value C (910): offset data corresponding to the head position of the combined JPEG image section 905.

Offset value D (911): offset data corresponding to the head position of a combined thumbnail image parallax map section 906.

Offset value E (912): offset data corresponding to the head position of a combined JPEG image parallax map section 907.

The starting position of each image data stored in an image file is specified using the offset values B, C, D, and E.

The parallax map section 902 is constituted by the combined thumbnail image parallax map section 906 and the combined JPEG image parallax map section 907. The combined thumbnail image section 904 is a region for storing thumbnail image data which is resized by thinning JPEG image data or the like stored in the combined JPEG image section 905. Thumbnail image data is used, for example, when index display is performed on the screen of the display unit 516. The combined JPEG image section 905 is a region for storing combined JPEG image data which is obtained by compressing image data obtained from the imaging element 505, which has been processed by the imaging signal processing circuit 506, by the compression/decompression circuit 515. The image data is data which can be handled by many generally-used applications. In the present embodiment, JPEG image data, which is obtained by additively combining right-eye image data with left-eye image data by the image combining circuit 513, is stored in the combined JPEG image section 905. An image is obtained which is capable of being reproduced as a 2D display image reflecting the correct shape of an object by additively combining the left-eye image with the right-eye image. Furthermore, left-eye image data and right-eye image data can be restored using a parallax map, and thus, image data can be reproduced as a three-dimensional display image. The combined thumbnail image parallax map section 906 is a region for storing the parallax map data generated in accordance with the size of a combined thumbnail image. Also, the combined JPEG image parallax map section 907 is a region for storing map data indicating the parallax amount of the combined JPEG image. The combined thumbnail image parallax map and the combined JPEG image parallax map are arranged at the rear of the image file 900 as the parallax map section 902, resulting in an improvement in the convenience of editing such as image reproduction, parallax map deletion, or the like when the parallax map(s) is not used.

Figure 24:
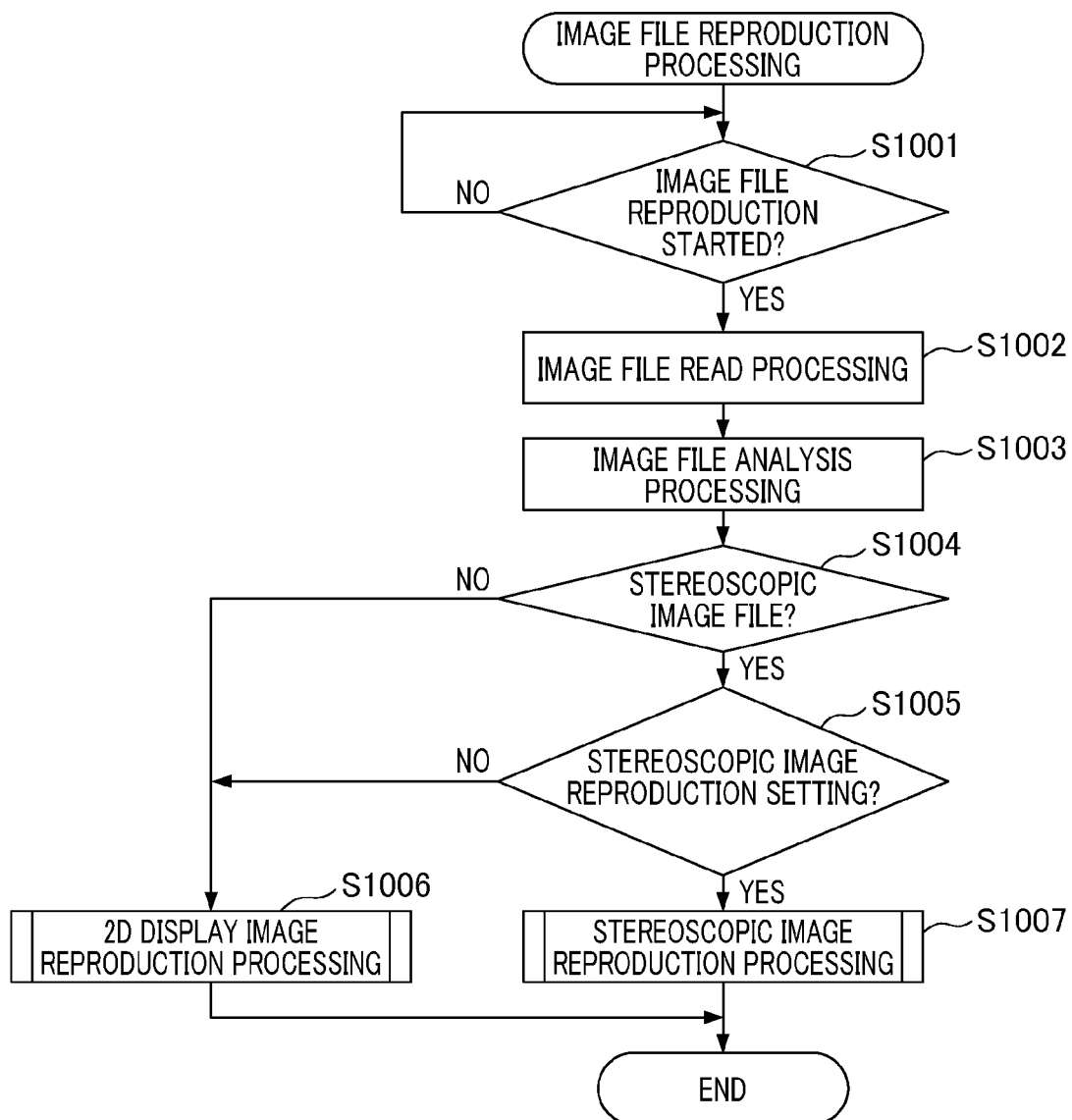
FIG. 24 is a flowchart illustrating DCF image file reproduction processing.

Next, a description will be given of DCF image file reproduction processing with reference to the flowchart shown in FIG. 24. The present processing is executed under the control of the system control unit 509. In step S1001, it is determined whether or not an image replay button (not shown) provided in the operation unit of the external I/F unit 512 has been operated. When it is determined that a user has not operated the image replay button, the determination processing in step S1001 is repeated, whereas when it is determined that a user has operated the image replay button, the process advances to step S1002. In step S1002, processing for reading image file data from the recording medium 511 to the memory unit 508 via the recording medium control I/F unit 510 is executed. Next, in step S1003, the image file read into the memory unit 508 in step S1002 is analyzed. In image file analysis processing, the structure of the DCF image file is analyzed, which allows access to each image data. Next, in step S1004, it is determined whether or not the image file is an image file for three-dimensional display based on the result of analysis in step S1003. Determination processing for an image file for three-dimensional display is determination whether or not the image file is an image file by which a left-eye image and a right-eye image can be prepared. In the present embodiment, it is determined that the image file is an image file for three-dimensional display if the image file has left-eye image data and right-eye image data as described in FIG. 22 or if the image file has the parallax map as described in FIG. 23. If the result of determination regarding the image file is YES, the process advances to step S1005, whereas if NO, the process advances to step S1006.

Next, in step S1005, it is determined whether or not a stereoscopic image reproduction setting has been set. Whether image reproduction for two-dimensional display or image reproduction for three-dimensional display is performed can be arbitrarily specified by a user operation. Even in the case of an image file for three-dimensional display, a user can select image reproduction for two-dimensional display. A user can make a desired reproduction setting by a menu selecting operation or the like on the screen of the display unit 516 using the operation unit, and setting information is stored in the memory unit 508. If it is determined in step S1005 that the setting is not a reproduction setting for a stereoscopic image, the process advances to step S1006, and 2D display image reproduction processing is performed, that is, a 2D display image (hereinafter referred to as "2D image") is reproduced. This processing will be described below with reference to FIG. 25. On the other hand, if it is determined in step S1005 that the setting is a reproduction setting for a stereoscopic image, the process advances to step S1007, and stereoscopic image reproduction processing is performed, that is, a 3D display image is reproduced. This processing will be described below with reference to FIG. 26. As described above, in image file reproduction processing performed by the imaging apparatus of the present embodiment, image reproduction can be performed on both 3D display and 2D display using an image file for a stereoscopic image.

Figure 25:
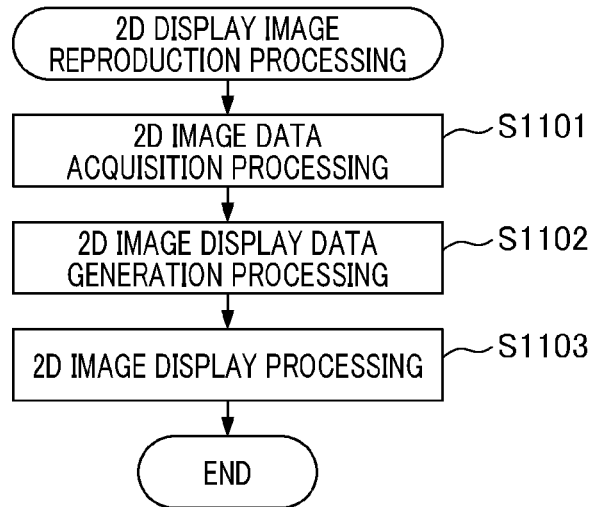
FIG. 25 is a flowchart illustrating 2D display image reproduction processing.

Next, a description will be given of 2D display image reproduction processing in step S1006 shown in FIG. 10 with reference to FIG. 25. In step S1101, processing for acquiring 2D image data from an image file is performed. In 2D image data acquisition processing, combined JPEG image data is acquired from the analyzed image file as data for being reproduced as a 2D image. In case that a file has image data captured by other than the imaging apparatus of the present embodiment and does not have combined JPEG image data, reproduction compatibility improves when processing for acquiring another image data as a 2D image is performed. Next, in 2D image display data creation processing in step S1102, display data is created from the 2D image data acquired in step S1101. In the present processing, the display control circuit 517 processes data decompressed by the compression/decompression circuit 515, and thus, data for being displayed as a 2D image on the display unit 516 is created. Next, in step S1103, the display unit 516 performs 2D display in accordance with the display data created in step S1102 under the control of the display control circuit 517. In 2D image display processing, display data is processed without distinguishing between a left-eye image and a right-eye image as in stereoscopic image display processing to be described below. In this manner, a 2D image can be reproduced based on the image file.

Figure 26:
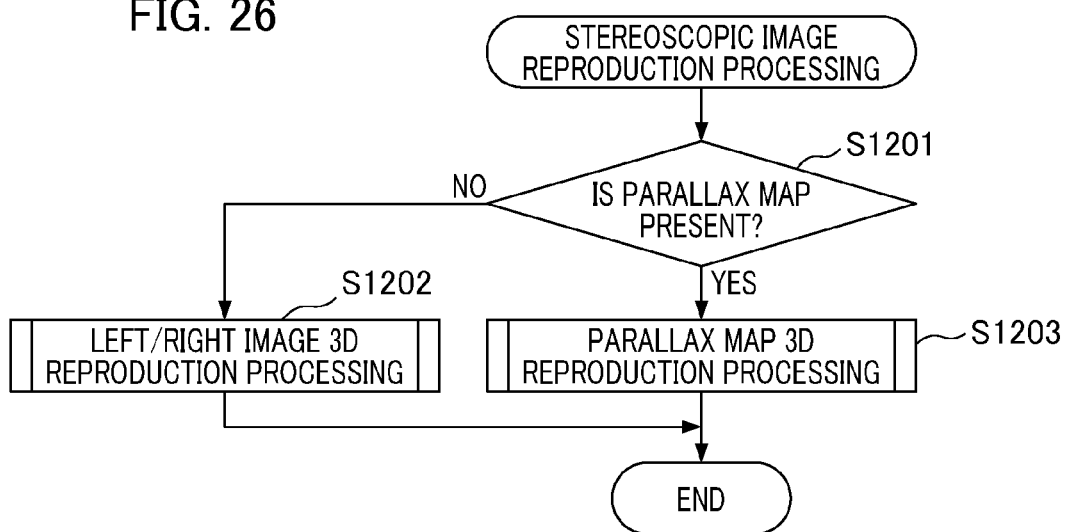
FIG. 26 is a flowchart illustrating 3D display image reproduction processing.

Next, a description will be given of stereoscopic image reproduction processing in step S1007 shown in FIG. 10 with reference to FIG. 26. In step S1201, it is determined whether or not a parallax map is present in the image file. The presence/absence of a parallax map can be determined by the result of analysis in step S1003. If it is determined that there is no parallax map in the image file, the process advances to step S1202 and left/right image 3D reproduction processing is executed. Left/right image 3D reproduction processing will be described below with reference to FIG. 27. On the other hand, if it is determined that there is a parallax map in the image file, the process advances to step S1203 and parallax map 3D reproduction processing is executed. Parallax map 3D reproduction processing will be described below with reference to FIG. 28. In the 3D reproduction processing of the present embodiment, 3D reproduction using the left/right images and 3D reproduction using the parallax map can be performed.

Figure 27:
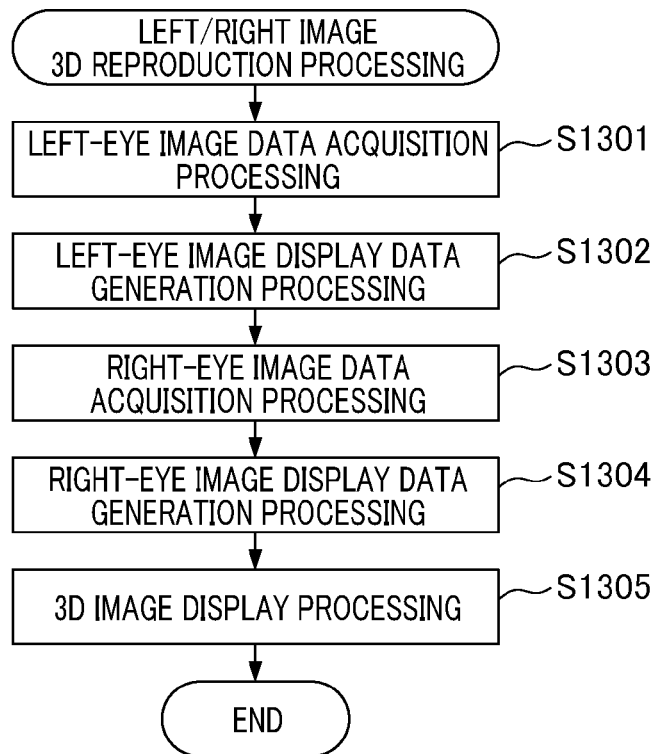
FIG. 27 is a flowchart illustrating left/right image 3D reproduction processing.

Next, a description will be given of left/right image 3D reproduction processing in step S1202 shown in FIG. 26 with reference to FIG. 27. In left-eye image data acquisition processing in step S1301, left-eye JPEG image data is acquired from the image file data expanded on the memory unit 508. Next, in display data creation processing in step S1302, left-eye image display data is created from the left-eye JPEG image data acquired in step S1301. In left-eye image display data creation processing, data for displaying an image on the display unit 516 by the display control circuit 517 is created based on the data decompressed by the compression/decompression circuit 515. Next, in right-eye image data acquisition processing in step S1303, right-eye JPEG image data is acquired from the image file data expanded on the memory unit 508. Next, in display data creation processing in step S1304, right-eye image display data is created from the right-eye JPEG image data acquired in step S1303. In right-eye image display data creation processing, data for displaying an image on the display unit 516 by the display control circuit 517 is created based on the data decompressed by the compression/decompression circuit 515. In step S1305, the display unit 516 performs 3D image display processing in accordance with the left-eye image display data created in step S1302 and the right-eye image display data created in step S1304. In the present processing, image display is performed by the known technique such that different video image light is incident on the left eye and the right eye of a user, but a description thereof will be omitted. In this manner, a 3D image can be reproduced based on an image file having left-eye image data and right-eye image data.

Figure 28:
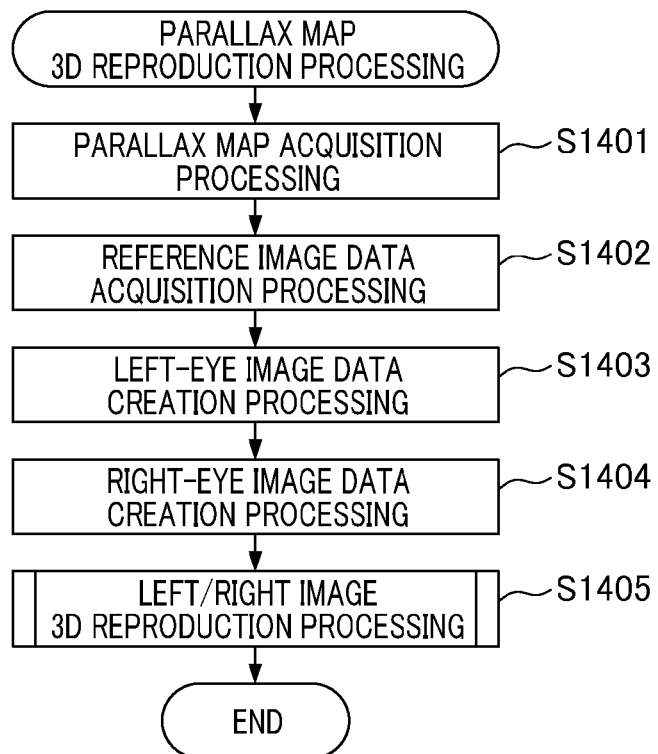
FIG. 28 is a flowchart illustrating parallax map 3D reproduction processing.

Next, a description will be given of parallax map 3D reproduction processing in step S1203 shown in FIG. 26 with reference to FIG. 28. In parallax map acquisition processing in step S1401, data for a combined JPEG image parallax map is acquired from the image file data expanded on the memory unit 508. Next, in reference image data acquisition processing in step S1402, reference image data is acquired from the image file data expanded on the memory unit 508. The term "reference image" used herein refers to image data corresponding to the parallax map acquired in step S1401. In the present embodiment, the reference image is combined JPEG image data. Next, in left-eye image data creation processing in step S1403, left-eye image data is created from the parallax map acquired in step S1401 and the reference image data acquired in step S1402. The parallax map includes data representing the parallax amount of the centroid of an object image in a combined image relative to the corresponding centroid thereof in a left-eye image. Left-eye image data is generated by moving the object image to the centroid of the object image in the left-eye image, which corresponds to the parallax amount, using the data. Next, in right-eye image data creation processing in step S1404, right-eye image data is created from the parallax map acquired in step S1401 and the reference image data acquired in step S1402. The present processing is performed in the same manner as left-eye image data creation processing. In this case, the parallax amount of the centroid of an object image in the combined image relative to the corresponding centroid of the object image in the right-eye image is obtained by the inverted sign of the parallax amount indicated by the parallax map data. Right-eye image data can be generated by moving the object image to the centroid of the object image in the right-eye image, which corresponds to the parallax amount. In step S1405, left/right image 3D reproduction processing as described in FIG. 13 is executed using the left-eye image data created in step S1403 and the right-eye image data created in step S1404. At this time, color space information is imparted to the missing pixel. In this manner, left-eye image data and right-eye image data are generated from the image file having parallax map data, and thus, a 3D image can be reproduced based on these two image data.

As described above, according to the present embodiment, 2D image reproduction and 3D image reproduction can be performed using a DCF image file. In other words, the combined image data is generated from a plurality of image data obtained by the imaging element 505, and thus, an image reflecting the correct shape of an object can be reproduced in both 2D display using the combined image data and 3D display using the combined image data and the parallax map data. Thus, a user can view a reproduction image without an unnatural impression.

By applying a series of processing described in the present embodiment to a thumbnail image, an imaging apparatus may be provided that is capable of reproducing a plurality of reduced images in 2D display or 3D display when index display is performed on the display unit 516. In this case, the image combining circuit 513 generates image data for reduced image display from the combined image data. Also, the parallax map generation circuit 514 generates parallax map data for reduced image display using the left-eye image data and the right-eye image data. When the image file includes the combined image data and the parallax map data for reduced image display, the system control unit 509 controls image reproduction for three-dimensional display by generating left-eye reduced image data and right-eye reduced image data from these data. When the image file includes left-eye reduced image data and right-eye reduced image data, reduced image reproduction for three-dimensional display can be performed using these data.

Although a description has been given of the preferred embodiments of the present invention, the present invention is not limited to these embodiments, but the file structure in which the arrangement order of image data is changed depending on various applications such as image editing or the like may also be used. For example, when a thumbnail image is not used for three-dimensional display, only combined image data may be recorded in a file without left-eye image data and right-eye image data, and thus, various modifications and changes may be made on the file structure.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-220409 filed Oct. 4, 2011, Japanese Patent Application No. 2011-264204 filed Dec. 2, 2011, and Japanese Patent Application No. 2011-264282 filed Dec. 2, 2011 which are hereby incorporated by reference herein in their entirety.

What is claimed is:

1. An imaging apparatus comprising:
   a plurality of photoelectric conversion units configured to output a plurality of image signals by photoelectrically converting light fluxes each having passed through a different pupil region of an imaging optical system;
   an image generating unit configured to generate a combined image signal by combining image signals corresponding to the light fluxes each having passed through the different pupil regions of the imaging optical system among the plurality of image signals output by the plurality of photoelectric conversion units;
   a parallax map generating unit configured to generate parallax map data based on an image signal corresponding to a region which is one of a pair of the pupil regions; and
   a recording unit configured to generate a single Design rule for Camera File system (DCF) image file including the combined image data and the parallax map data, and record the DCF image file in a recording medium.

2. The imaging apparatus according to claim 1, wherein, the recording unit records the DCF image file to include a JPEG (Joint Photographic Experts Group) image of the combined image data.

3. The imaging apparatus according to claim 1, wherein the recording unit combines a reduced image signal generated by resizing the combined image signal and reduced parallax map data obtained by resizing the parallax map data corresponding to the reduced image signal to record an image signal in the DCF image file.

4. The imaging apparatus according to claim 1, further comprising:
   an imaging element comprising a plurality of micro lenses and outputting a plurality of image signals,
   wherein each of the micro lenses corresponds to the plurality of photoelectric conversion units.

5. The imaging apparatus according to claim 1, wherein the parallax map data is data corresponding to a parallax amount for each region of an image data between the image signals corresponding to the light fluxes each having passed through the different pupil regions of the imaging optical system.

6. An imaging apparatus comprising:
   an acquiring unit configured to acquire an image signal output by a plurality of photoelectric conversion units configured to output a plurality of image signals by photoelectrically converting light fluxes each having passed through a different pupil region of an imaging optical system and a combined image signal by combining image signals corresponding to the light fluxes each having passed through the different pupil regions of the imaging optical system among the plurality of image signals;
   a parallax map generating unit configured to generate parallax map data based on an image signal corresponding to a region which is one of a pair of the pupil regions among the plurality of image signals; and
   a recording unit configured to generate a single Design rule for Camera File system (DCF) image file including the combined image data and the parallax map data, and record the DCF image file in a recording medium.

7. A control method which is executed by an imaging apparatus, the method comprising:
   outputting, by a plurality of photoelectric conversion units, a plurality of image signals by photoelectrically converting light fluxes each having passed through a different pupil region of an imaging optical system;
   generating a combined image signal by combining image signals corresponding to the light fluxes each having passed through the different pupil regions of the imaging optical system among the plurality of image signals output by the plurality of photoelectric conversion units;
   generating parallax map data based on an image signal generated from the signal corresponding to a region which is one of a pair of the pupil regions; and
   creating a single Design rule for Camera File system (DCF) image file including the combined image data and the parallax map data, and record the DCF image file in a recording medium.

* * * * *